US009290010B2

(12) United States Patent
Hanina et al.

(10) Patent No.: US 9,290,010 B2
(45) Date of Patent: Mar. 22, 2016

(54) METHOD AND APPARATUS FOR FRACTAL IDENTIFICATION

(71) Applicant: Ai Cure Technologies, Inc., New York, NY (US)

(72) Inventors: Adam Hanina, New York, NY (US); Maurice Lepouttre, Brooklyn, NY (US); Lei Guan, Harrison, NJ (US)

(73) Assignee: Ai Cure Technologies, Inc., New York, NY (US)

( * ) Notice: Subject to any disclaimer, the term of this patent is extended or adjusted under 35 U.S.C. 154(b) by 0 days.

(21) Appl. No.: 13/646,634

(22) Filed: Oct. 5, 2012

(65) Prior Publication Data

US 2013/0088555 A1    Apr. 11, 2013

Related U.S. Application Data

(63) Continuation of application No. 13/338,602, filed on Dec. 28, 2011, now Pat. No. 8,720,790.

(60) Provisional application No. 61/544,056, filed on Oct. 6, 2011, provisional application No. 61/623,148, filed on Apr. 12, 2012, provisional application No. 61/623,193, filed on Apr. 12, 2012, provisional application No. 61/683,849, filed on Aug. 16, 2012.

(51) Int. Cl.
| | |
|---|---|
| *B41J 2/01* | (2006.01) |
| *G06K 9/46* | (2006.01) |
| *B41J 3/407* | (2006.01) |
| *G06K 9/00* | (2006.01) |

(52) U.S. Cl.
CPC ............. *B41J 3/407* (2013.01); *G06K 9/00577* (2013.01)

(58) Field of Classification Search
USPC ................. 347/101, 103, 104, 105, 106, 107; 235/494; 382/232, 248, 249
See application file for complete search history.

(56) References Cited

U.S. PATENT DOCUMENTS

| | | | | |
|---|---|---|---|---|
| 4,728,783 | A * | 3/1988 | Brass et al. .................... | 235/456 |
| 4,941,193 | A * | 7/1990 | Barnsley et al. .............. | 382/249 |
| 5,065,447 | A | 11/1991 | Barnsley et al. | |
| 5,845,264 | A | 12/1998 | Nellhaus | |
| 5,992,742 | A | 11/1999 | Sullivan et al. | |
| 5,995,673 | A * | 11/1999 | Ibenthal et al. ............... | 382/249 |
| 6,002,794 | A * | 12/1999 | Bonneau et al. .............. | 382/166 |
| 6,661,904 | B1 * | 12/2003 | Sasich et al. .................. | 382/100 |
| 6,799,725 | B1 | 10/2004 | Hess et al. | |
| 7,059,526 | B1 | 6/2006 | Sullivan et al. | |
| 7,152,206 | B1 * | 12/2006 | Tsuruta ......................... | 715/202 |

(Continued)

OTHER PUBLICATIONS

Kiani, K.; Kosari, E.; Simard, M.R.; *A New Method of Fractal Barcodes Identification*; Proceedings of the World Congress on Engineering and Computer Science, 2011 vol. 1 WCECS 2011, Oct. 19-21, San Francisco, USA.

Kiani, S.; Moghaddam, M.E.; *A Multi-Purpose Digital Image Watermarking Using Fractal Block Coding*; Journal of Systems and Software, vol. 84, Issue 9, Sep. 2011, pp. 1550-1562 (Abstract only).

(Continued)

*Primary Examiner* — Anh T. N. Vo

(74) *Attorney, Agent, or Firm* — Gordon Kessler

(57) ABSTRACT

A method and system for applying and reading a fractal image to and from a plurality of objects to act as an identification label is provided. The system includes a printer for printing a fractal pattern to the plurality of objects and a reader for reading the printed fractal pattern. Such a fractal image is robust to printing and imaging difficulties and inconsistencies, and is difficult to copy, thus defending against counterfeiting.

14 Claims, 20 Drawing Sheets

(56) References Cited

U.S. PATENT DOCUMENTS

| | | | |
|---|---|---|---|
| 7,304,228 B2 | 12/2007 | Bryden et al. | |
| 8,422,792 B2 * | 4/2013 | Kruglick | 382/199 |
| 2007/0194034 A1 | 8/2007 | Vasiadis | |
| 2008/0138604 A1 | 6/2008 | Kenney et al. | |
| 2013/0127959 A1 * | 5/2013 | Hanina | 347/101 |

OTHER PUBLICATIONS

Kiani, S.; Moghaddam, M.E.; *A Fractal Based Image Watermarking for Authentification and Verification*; Image and Signal Processing, 2009, CISP 2009, Oct. 17-19, 2009 (Abstract only).

PCT Search report and written opinion, (Dec. 18, 2012),1-8.

* cited by examiner (a) Initial image     (b) 1 iteration     (c) 2 iteration (d) 3 iterations     (e) 4 iterations     (f) 5 iterations

(a) Initiator (b) Generator (c) 1 Iteration (d) 2 Iterations (e) 3 Iterations (a) Fractal Curve            (b) Encoded Fractal Curve (a) Fractal Curve            (b) Encoded Fractal Curve

METHOD AND APPARATUS FOR FRACTAL IDENTIFICATION

CROSS REFERENCE TO RELATED APPLICATIONS

This application claims the benefit of and incorporates by reference the entire contents of U.S. Provisional Patent Application Ser. No. 61/544,056, titled Method and Apparatus for Fractal Identification, filed Oct. 6, 2011 to Hanina; U.S. Provisional Patent Application Ser. No. 61/623,148, titled Method and Apparatus for Fractal-ID™—Fractal Identification and Verification System, filed Apr. 12, 2012 to Hanina et al; U.S. Provisional Patent Application Ser. No. 61/623,193, titled Method and Apparatus for Fractal-ID™—L-System Fractal Curve Identification, filed Apr. 12, 2012 to Hanina et al.; and U.S. Provisional Patent Application Ser. No. 61/683,849, titles Method and Apparatus for Identification, filed Aug. 16, 2012 to Hanina et al. This application is also a continuation-in-part of U.S. patent application Ser. No. 13/388,602, titled Method and Apparatus for Fractal Identification, filed Dec. 28, 2011 to Hanina, the entire contents thereof being incorporated herein by reference.

TECHNICAL FIELD

This application relates generally to the identification of objects using printed identifiers, and more particularly to the identification of small, uneven, differently shaped, or other objects, such as medication pills, using one or more identifiers embedded in a fractal-based printed identifier (or an identifier based upon another mathematical system) to create a visually complex fingerprint.

BACKGROUND

Counterfeit Medication

A counterfeit medication or a counterfeit drug is a medication or pharmaceutical product which is produced and sold with the intent to deceptively represent its origin, authenticity or effectiveness. A counterfeit drug may contain inappropriate quantities of active ingredients or none at all, may be improperly processed within the body (e.g., absorption by the body), may contain ingredients that are not on the label (which may or may not be harmful), or may be supplied with inaccurate or fake packaging and labeling. Counterfeit medicinal drugs include those with less or none of the stated active ingredients, with added, sometimes hazardous, adulterants, substituted ingredients, completely misrepresented, or sold with a false brand name. Otherwise legitimate drugs that have passed their date of expiry are sometimes remarked with false dates. Low-quality counterfeit medication may cause any of several dangerous health consequences including side effects, allergic reactions, in addition to their obvious lack of efficacy due to having less or none of their active ingredients. Medicines which are deliberately mislabeled in order to deceive consumers—including mislabeled but otherwise genuine generic drugs—are counterfeit.

Since counterfeiting is difficult to detect, investigate, quantify, or stop, the quantity of counterfeit medication is difficult to determine. Counterfeiting occurs throughout the world, although there are claims that it is more common in some developing countries with weak regulatory or enforcement regimes. It is estimated that more than 10% of drugs worldwide are counterfeit, and in some countries more than 50% of the drug supply is counterfeit. In 2003, the World Health Organization estimated that the annual earnings of counterfeit drugs were over US$32 billion.

The considerable difference between the cost of manufacturing counterfeit medication and price that counterfeiters charge is a lucrative incentive. Fake antibiotics with a low concentration of the active ingredients can do damage worldwide by stimulating the development of drug resistance in surviving bacteria. Courses of antibiotic treatment which are not completed can be dangerous or even life threatening. If a low potency counterfeit drug is involved, completion of a course of treatment cannot be fully effective. Counterfeit drugs have even been known to have been involved in clinical drug trials.

Medication Identification

In addition to the problem with counterfeit medications, simple identification of medication is also an extremely large problem. More than 80% of adults in the U.S. take at least one pill a week, whether prescription, OTC, vitamin or herbal. Yet the pills they are taking are difficult to identify based on their visual characteristics alone. Pill identification, or the inability to correctly visually identify a pill, is a large contributing factor to medication errors. These errors can occur anywhere along the drug-taking process. Difficulty with pill identification is further exacerbated when patients are older, have some form of impairment, take multiple drugs or have limited health literacy. 1.5 million people are harmed each year because of medication errors The cost of treating drug-related injuries in hospitals is approximately $3.5 billion per year. The actual number of medication errors is presumably much higher since not all medication errors lead to injury or death. A pill's poor labeling and packaging are thought to cause one third of medication errors, while studies have also shown that a pill's shape and color are important factors in drug identification.

Existing Identification and Anti-Counterfeiting Technologies

There are several technologies that have been employed in an effort to combat the counterfeit drug problem, and to allow for identification of medication. An example is radio frequency identification which uses electronic devices to track and identify items, such as pharmaceutical products, by assigning individual serial numbers to the containers holding each product. The U.S. Food and Drug Administration (FDA) is working towards an Electronic pedigree (ePedigree) system to track drugs from factory to pharmacy. This technology may prevent the diversion or counterfeiting of drugs by allowing wholesalers and pharmacists to determine the identity and dosage of individual products. Some techniques, such as Raman spectroscopy and Energy Dispersive X-Ray Diffraction (EDXR) can be used to discover counterfeit drugs while still inside their packaging. Other more traditional systems may be applied to such medication identification, such as barcoding being provided on medication packaging (either one or two dimensional). For such a use, however, any damage to the barcode, difficulty in printing the barcode (such as deformation based upon printing surface), or obscuring a portion of the barcode may render the barcode inoperative.

Marking individual pills with one or more identifiers is considered a useful method for identification, but has been traditionally thought of being cost prohibitive while offering only minimal improvement over packaging marking. One or more barcodes may be employed (either one or two dimensional) and may be printed to individual medication pills, instead of, or in addition to being printed to the medication packaging. Such a printing process may be implemented by employing one or more appropriate printing apparatuses, such as a pad printing apparatus provided by Printing International® N.V./S.A., for example. Thus, each pill may be individually printed with the use of such a pad printing apparatus. Laser marking has also been used to print high-resolution images or barcodes directly onto pills. In consumable products, Mars®, Inc. utilizes inkjet or pad printers to print images cheaply onto individual pieces of candy. Indeed, U.S. Pat. No. 7,311,045 describes a system for printing multi color images on a candy by maintaining a directional registration of the candy between printing steps. In each instance, holding each individual medication pill or candy is performed by vacuuming the pieces in place, and holding the piece firmly in place between steps so that orientation of the piece during printing does not change. Other patents and applications assigned to Mars®, Inc. describe a number of systems and methods for printing food grade inks onto shaped candy elements.

While one or two dimensional barcodes have been used to serialize individual pills and verify authenticity and identity, but as recognized by the inventors of the present invention, their designs are relatively easy to replicate, require fixed surface areas and specific alignment for printing, and are rendered unusable if occlusion occurs due to handling or if the barcode is damaged. Unlike forensic features, which are embedded into an item, in barcode technology the item's physical attributes are completely distinct from the barcode itself. Further, whether using such a pad printing process, or employing other printing methods such as ink jet printing or laser marking for imparting markings to candy or medication pills, the inventors of the present invention have recognized that the need for purposefully handling individual pills may be time consuming and expensive. Further, the described printed elements may fail to provide robust images sufficient to act as a unique identifier for a particular batch of processed elements. For such a use, as noted, any damage to the barcode, difficulty in printing the barcode (such as deformation based upon printing surface), or obscuring a portion of the barcode may render the barcode inoperative. Additionally, barcodes may be easily copied and applied to counterfeit objects. None of these systems are sufficient for imparting robust identification information to a pill or other candy object.

Similar problems of identification of other products or objects, such as consumer products and the like, may also arise. While holographic printing on hang tags and the like has been employed in an effort to mark such objects, and to perhaps stop counterfeiting of these objects, these tags may be removed and possibly copied as printing on a single tag may not be seen as a particularly difficult deterrent. Thus, not only is secure identification impossible, varying levels of desired security cannot be employed.

Therefore, it would be desirable to provide a method and apparatus that overcome the drawbacks of the prior art.

SUMMARY

In accordance with one or more embodiments of the present invention, a standardized process for labeling and identifying medication and other objects is provided, and in particular may comprise a system and method for printing an identification pattern to a plurality of regularly or irregularly shaped and arranged objects. In particular, a fractal pattern is preferably printed as the identification pattern onto a plurality of medication pills or other objects. At a later time, computer vision may be applied to read these applied fractal labels to automatically confirm identification and authenticity of the pills or other objects, irrespective of orientation, partial occlusion, or partial damage of the printed fractal image. Finally, different levels of fractal dimensions (the number of times the fractal pattern is recursively printed within itself) may be printed and therefore read from these fractal images employing different resolution imaging devices, providing varying levels of security and precision in the identification process while allowing for ease of identification and a reduced usability burden. Thus, imaging devices with lower resolution imaging capabilities may be able to resolve one or two fractal dimensions and provide a lower, less expensive, consumer oriented level of authentication, while higher resolution imaging devices may be able to resolve seven or more fractal dimensions, thus providing additional security where desired.

Security Approaches

The inventors of the present invention have recognized that four schemes have typically been used by pharmaceutical manufacturers to identify and authenticate medication.

1) Overt on-product marking including holograms, packaging graphics, etc. Overt features allow the public to see whether a medication is false or not, which may be useful during the drug taking process to flag counterfeits, and to allow individuals to confirm that they are taking the correct medication.
2) Covert marking, including invisible ink, embedded images and watermarks, etc. Covert features are unidentifiable to the public and are usually places on the medication packaging. Such covert markings provide a higher level of security than overt marking as they are more difficult to copy.
3) Forensic marking, including chemical, biological and DNA taggants. Forensic features, which are integrated into the physical properties of the medication, are available for even higher security authentication or where scientifically tested authentication of the item may be required. Of course, destruction of the product may be required for authentication, and a change to the manufacturing process of those items is necessary for implementation.
4) Track and trace solutions, including bar codes, serialization, Radio Frequency Identification/RFID tags, etc. Track and trace technologies allow for near real-time medication tracking throughout the supply chain from the manufacturer to the pharmacy, and to the patient, and have been typically employed by entities along the supply chain. While end users have not been traditionally included in this solution, as noted above, such systems are becoming more readily available for end users.

While each approach has advantages and disadvantages, employing components from all four solutions is desirable to effectively identify and authenticate medications. While one or more of the above schemes are typically employed on medication packaging, the inventors of the present invention have recognized that labeling the individual pills or capsules may provide an even more robust solution. This allows for both identification and authentication to occur even if a medication has been separated from its packaging. Throughout the supply chain, medications typically change hands—from the manufacturer to the distributor to the repackager to a secondary distributor and then to the pharmacy—many times before they end up with the patient. Therefore, this ability to identify medications down to the identity of a single pill, may provide substantial additional benefit.

Fractal Encoding

Fractal geometry is a branch of mathematics that deals with geometric objects that are too detailed to be described by standard Euclidean geometry [4]. K. Falconer, *Fractal Geometry* (Wiley, West Sussex, England, 2003). While there is no precise definition of what constitutes a fractal, there are some properties that most fractals share:

self-similarity: parts of each fractal are similar to the whole in some sense (i.e., geometrical, approximate, statistical).

fine structure: zooming in on a portion of the fractal reveals detail no matter how small the scale may be.

fractal dimension: the "fractal dimension" of the fractal is greater than its topological dimension (i.e., 1 for a line, 2 for a square, 3 for a cube).

simple definition: though the fractal itself may be quite complex, its mathematical description is very simple.

A fractal is a rough or fragmented geometric shape that can be split into parts, each of which is (at least approximately) a reduced-size copy of the whole, a property called self-similarity. A fractal often has the following features:

It has a fine structure at arbitrarily small scales.

It is too irregular to be easily described in traditional Euclidean geometric language.

It is self-similar (at least approximately or stochastically).

It has a Hausdorff dimension which is greater than its topological dimension (although this requirement is not met by space-filling curves such as the Hilbert curve).

It has a simple and recursive definition.

Because they appear similar at all levels of magnification (at each printed dimension), fractals are often considered to be theoretically infinitely complex (in informal terms).

By encoding one or more pieces of identification information into such a fractal through the use of one or more predetermined fractal type, color, or other fractal parameter, and printing or otherwise etching the resulting fractal onto a plurality of medication pills or other objects, a robust and secure medication or object identification scheme may be provided. Varying resolutions and complexities of such fractals may be employed in order to impart desired levels of security. More complicated fractals having a greater number of dimensions (and thus allowing an imaging device with higher levels of resolution to recognize the fractal pattern more completely at these greater levels of resolution may be employed for use with objects needing higher levels of security, as these more complex fractals are more difficult (or impossible) to copy, requiring at least higher quality printers and readers that may not be easily available. As further recognized by the inventors of the present invention, a low-cost tool such as a webcam combined with computer vision software may be provided to a patient to properly image and identify a medication at a lower level of security.

Once applied, the fractal image provides a robust identification system that is resilient against identification when partially occluded, or when printing is imperfect because of object shape, position, surface texture or the like. Thus, one or more predetermined characteristics of a pill or other object may be employed to be used as part of an identifier for the object. In such a manner, not only is the fractal image used to prevent against counterfeiting as it is difficult or reproduce, but further various characteristics of the object, such as color, shape, texture, markings and the like, may combine with such a fractal image to produce a unique fractal/object characteristic combination. As the characteristics of the fractal alone are known, the fractal image may act as a calibration tool to determine any influence the color, for example, of the pill may have on the actual fractal color, thus allowing for an accurate determination of pill color. In such a manner, these noted characteristics of the object may cause one or more distortions in the shape, color, or other attribute of the printed fractal image, these distortions being potentially resolvable and recognizable at differing desired imaging resolutions, providing differing levels of security. While a pill may also distort barcodes and other printed images, barcodes include thick lines and may hide any details of geometry changes. It is the unique structure of a fractal, and its multi-dimensional, intricate structure, that makes it ideal for performing this task as less of the pill surface is obscured, allowing for additional opportunities for measuring such distortion and other subtle geometric changes in a medication pill or other item. The use of reference points in such a printed fractal image, and expected distances therebetween or orientations thereof, may thus allow for precise determination of distortions of the image based upon printing techniques and pill shape.

Furthermore, because of the self replicability of fractal images, the application of these unique fractal identifiers may be generated that may be applied substantially simultaneously to a large group of medication pills or objects without regard to orientation or relative positioning of the objects during printing. The resulting identification images are robust even if portions of the printed images are not properly printed, or are damaged, obscured or otherwise occluded. Thus, during a preferred printing process, these pills or other objects need only be maintained in approximately a single layer during the printing process. Strict orientation and arrangements of the medication pills during printing or subsequent imaging is not required (in that fractal patterns are recursive patterns that may be viewed at any level of detail and give the same information). Additionally, the entire portion of the fractal need not be properly printed on the pill, providing additional robustness in the printing process. Thus vacuuming of the pills in a particular orientation for printing is not necessary, allowing a relatively disorganized set of pills to be printed at one time.

Additionally, multiple fractal patterns may be overlaid, thus producing a more complex identification image. These overlaid fractals may be electronically combined before printing, thus requiring a single printing pass, or may use multiple printing passes, thus, printing multiple fractals at different times on the pills. These overlaid fractal patterns may also be selected to provide different imaging results, such as a first fractal image allowing for a more accurate measurement of shape and color of the medication pill, and another fractal image providing various medication information. Further, by providing more complete coverage of a pill surface, while simultaneously perhaps allowing substantial portions of the pill surface to be viewable along with the fractal image, the geometry of the pill and any unique or identifiable geometric characteristics may be more accurately determined through a measurement of distortion of the fractal images by the shape of the pill.

Therefore in accordance with one or more printing mechanism embodiments of the invention, because any portion of the fractal image is sufficient to provide all of the information, a conveyer mechanism may be provided for forwarding, in either a continuous or batch processing manner, a plurality of medication pills to a printing area, in addition to the use of the individual pill printing schemes of the prior art. If forwarded in a batch manner, a fractal image is preferably printed on the area containing the medication pills in a manner employing, by way of example only, ink jet printing technology of the type described above with reference to the '045 patent, the contents thereof being incorporated herein by reference. Other printing or etching technologies, such as laser etching, laser marking, photographic exposure, chemical etching, photolithography, solid ink printing or the like may be employed, each preferably providing different and varying possible resulting resolutions for offering differing levels of security. Additionally, one or more medication pills may be coated with a laser or light sensitive material that allows for marking of the pill, while being consumable by humans. However, unlike the '045 patent, rather than managing objects piece by piece, in accordance with the present invention, because of the nature of fractal images, a single image may be provided to the plurality of medicine pills at one time. In such a manner, each pill will receive only a portion of such an image. Because of the self referential nature of fractals, this part of the image will be sufficient to provide an identifiable amount of information that may be recovered with computer visual recognition technology. Of course, batches of such pills may be manually or otherwise placed in a printing area, and removed after printing.

If forwarded in a continuous manner, a fractal pattern that may have bounds in the direction across the direction of travel of the plurality of pills, but is continuously repeatable in the direction of travel, may be applied. In this manner, a very large number of such pills may be processed continuously and inexpensively, and therefore in accordance with other continuous manufacturing and processing of such pills.

While the invention is described as relating to medication pills, the invention may be applied to any objects in which such an identification application may be beneficial, including any type of small, uneven, or irregularly-shaped object part, including for pricing, and anywhere a traditional bar code or two dimensional bar code may be employed, and where the integrity of the item makes it important to track and identify the object.

L-Systems

In The Fractal Geometry of Nature (W.J. Freedman and Co., New York, 2$^{nd}$ Edition, 1983), Benoit Mandelbrot described a method for the construction of a Koch curve using simple geometric figures. Starting with an initiator made up of connected line segments, at each iteration each line segment is replaced with a scaled copy of a generator. Repeating this process infinitely many times yields a fractal curve. FIG. 21 illustrates this construction for the first few iterations. Fractal curves can also be represented symbolically using a formal string-rewriting system known as L-systems. Originally developed by Aristid Lindenmayer (Prusinkiewicz, P. & Lindenmayer, A., The Algorithmic Beauty of Plants. Springer-Verlag, New York. Retrieved from http://www.algorithmicbotany.org (Original work published 1990).) to study the growth of plants, L-systems consist of an alphabet (a set of characters) and production rules, which specify the rules for character replacement. Similar to Chomsky grammars, the main difference is that L-systems apply production rules simultaneously rather than sequentially. If each line segment of an initiator is represented by a single character and the production rules substitute this character with a string representing a generator, then there is a direct mapping between L-system strings and fractal curves. This mapping provides the ability to represent a fractal curve in a computer as a sequence of characters.

In order to map strings of characters into geometric objects, turtle graphics have been developed. The "turtle" marks a position on a plane. It's movement is dictated by the string generated by an L-system. Each character of the L-system is given a geometric interpretation, i.e., move forward by distance and draw a line segment, turn right by angle, turn left by angle, etc. FIG. 22, known as the quadratic Koch curve, illustrates this construction using L-systems. FIG. 22(a) illustrates a string representation of the initiator, FIG. 22(b) depicts a representation of a generator, while FIG. 22 (c), (d) and (e) depict iterations of the L-system. The production rule for this generator is F→F+F−F−FF+F+F−F. Here, "F" means moves forward by one unit and draw a line segment, "+" means turn left, "−" means turn right, and is set at 90 degrees.

An interesting subset of fractal curves is the set of space filling curves. The name derives from the fact that with each iteration of one of these curves, it fills up an increasing amount of the area of a closed planar region; taken to the limit, a space filling curve will intersect every point within the region. FIG. 24 illustrates the construction of a Peano space filling curve, named after Guiseppe Peano who first discovered them. As is shown in FIG. 23, the alphabet is the set {F; +; −; R; L} where {F; +; −) have the same interpretation as the quadratic Koch curve discussed above, and {R. L} are placeholder characters used to generate the L-system strings. The initiator is L, and there are two productions rules: $p_1$: L→LFRFL−F−RFLFR+F+LFRFL and $p_2$: R→RFLFR+F+LFRFL−F−RFLFR.

Current barcoding technology consists of traditional one-dimensional barcodes, typified by UPC codes, and newer two-dimensional matrix barcodes like MaxiCode and QR Code. One-dimensional barcodes encode and print data in a linear manner using alternating bars of varying width, while two-dimensional barcodes encode data in a matrix format. Both formats require the barcode to be scanned and placed in proper alignment. Both systems rely on a template: decoders extract information based on the location of bars, dots, or squares within a well-defined region. Error-detection methods are typically employed to increase the robustness of the systems, at the cost of decreased information capacity and/or increased barcode size.

Iterated Function Systems

Fractals can be represented as an Iterated function systems (IFS). IFSs were first introduced by Hutchinson (J. E. Hutchinson, "Fractals and self-similarity," Indiana Univ. Math. J. 30 (1981), pp. 713-747), and popularized by Barnsley. M. F. Barnsley, Fractals Everywhere (Academic Press, San Diego, 1988). IFS provide a simple and convenient definition for many fractals. An IFS consists of a finite set of contractions S={S1; S2, . . . , $S_m$}, m≥2, where the Si's are afine maps. If the scaling in the x and y directions are equal, the contraction is a similarity.

Given a closed subset $D \subseteq R^n$ (typically, $D=R_n$), a non-empty subset $A \subset D$ is called an attractor of the IFS if A is the fixed point of S, i.e., $$A = S(A) = \bigcup_{i=1}^{m} S_i(A) \qquad (2)$$

IFS's have unique attractors, some of which may be fractals. The typical requirement for an attractor to be a fractal is that it have non-integer dimension (this is discussed below). If all the contractions in the IFS are similarities, then the fractal is self-similar, i.e., composed of exact copies of itself. Otherwise, the fractal is self-affine, i.e., approximately self-similar.

From the definition of an IFS, it is clear that the sets of numerical values $\{a_i, b_i, \ldots, f_i\}$ for i=1, 2, . . . , m completely determine the IFS. An automatic generation process may be implemented in the following manner: for each i=1, 2, . . . , m, 6 numbers are preferably randomly chosen to form an affine map. The absolute value of the determinant of the affine map may then be computed; if it is less than 1 it is accepted, otherwise 6 new numbers are preferably randomly selected. This process may be repeated until m contraction mappings have been accepted. The attractor of the IFS may then be computed using either the deterministic or random iteration algorithm, and tested for its fractality with user-defined parameters such as fractal dimension. If accepted, the fractal can then be saved in a database by the numerical values comprising its IFS representation, along with its fractal parameters.

Two common methods for displaying attractors are 1) the deterministic algorithm (which follows directly from equation 2); and 2) a random iteration algorithm. For the deterministic algorithm, starting with an initial set of points, the contraction mappings are applied in sequence, and the union of the mapped points is computed. This process is iterated for a user-defined number of iterations. Good approximations to fractals can be computed with relatively few iterations. The following algorithm summarizes the process.

---
Algorithm 1 Deterministic
---
$A_0 \leftarrow$ initial set of points
$n \leftarrow$ number of iterations
for j = 1 → n do
    compute $S_1(A_{j-1})$
    ...
    compute $S_m(A_{j-1})$
    $A_j \leftarrow \cup_{i=1}^m S_i(A_{j-1})$
end for
plot $A_n$
---

Thus, after an initial set of points is defined and a number of iterations is selected, for each value of j affine maps S1→m are computed. Then an output of points based upon all of the computed affine maps for the particular value of j are combined and then plotted.

FIG. 10 illustrates the deterministic algorithm for the Sierpinski triangle based upon 10 iterations of the deterministic algorithm for the Sierpinski triangle, starting with the unit square. As is shown in FIG. 10, an initial set therefore comprises a unit square. A first iteration shows the replacement of each square in the first iteration with a set of three smaller squares. In each subsequent iteration, a similar substitution is made, replacing each square in the current iteration with the three square configuration. As shown, within a small number of iterations, the complexity of the image is greatly increased. By a shown $10^{th}$ iteration, substantial complexity is achieved. This fractal is generated by three contractions:

$$S_1(x, y) = \begin{pmatrix} 0.5 & 0 \\ 0 & 0.5 \end{pmatrix}\begin{pmatrix} x \\ y \end{pmatrix} + \begin{pmatrix} 0 \\ 0 \end{pmatrix}$$

$$S_2(x, y) = \begin{pmatrix} 0.5 & 0 \\ 0 & 0.5 \end{pmatrix}\begin{pmatrix} x \\ y \end{pmatrix} + \begin{pmatrix} 0.5 \\ 0 \end{pmatrix}$$

$$S_3(x, y) = \begin{pmatrix} 0.5 & 0 \\ 0 & 0.5 \end{pmatrix}\begin{pmatrix} x \\ y \end{pmatrix} + \begin{pmatrix} 0 \\ 0.5 \end{pmatrix}$$

As mentioned above, attractors of an IFS with non-integer dimension are considered fractals (ex: the Sierpinski triangle has dimension D≈1.585). Dimension is a frequently referenced parameter when discussing fractals, and its estimation is an area of much research \cite{Theiler90}. Dimension can be expressed as the exponent that relates the scaling of a geometric object's bulk (area, volume, mass, etc.) with it's size (length, perimeter, diameter, surface area, etc.):

$$\text{bulk''size}^{dimension} \qquad (3)$$

The second method for generating such a fractal, as noted above, may comprise a random iteration algorithm. Such a random iteration algorithm preferably works in the following manner according to the following algorithm:
select an initial point $p_0$,
randomly select one of the contraction maps and apply it to $p_0$ to obtain a new point $p_1$, repeat the process for a user-defined number of iterations.

The algorithm preferably produces one point at a time. The individual probabilities $p_i$ may be calculated by:

$$p_i = \frac{|\det S_i|}{\sum_{i=1}^m |\det S_i|} = \frac{|a_i d_i - b_i c_i|}{\sum_{i=1}^m |a_i d_i - b_i c_i|}.$$

The algorithm preferably outputs a sequence of points which may then be plotted. Detailed images can be created from many (>100, 000) iterations. FIG. 11 presents an example of the random iteration algorithm for a self-affine fractal. As the number of points computed increases (moving from portions a to b to c in FIG. 11 the algorithm fills in more of the attractor and provides a more accurate approximation. FIG. 11 illustrates the random iteration algorithm for the fractal defined by the following IFS, in accordance with the definitions noted above:

$$S_1(x, y) = \begin{pmatrix} 0.5 & -0.4 \\ -0.6 & -0.4 \end{pmatrix}\begin{pmatrix} x \\ y \end{pmatrix} + \begin{pmatrix} -0.8 \\ -0.9 \end{pmatrix}$$

$$S_2(x, y) = \begin{pmatrix} 0 & -0.4 \\ -1.1 & 0.2 \end{pmatrix}\begin{pmatrix} x \\ y \end{pmatrix} + \begin{pmatrix} 1 \\ 0.5 \end{pmatrix}$$

L-System Fractal Curve Barcodes

The inventors of the present invention have recognized that one of the principal features of fractals is their complexity. Complexity here is defined as fine detail at arbitrary resolution levels. In the case of fractal curves generated by L-systems, a few simple rules may yield extremely complex curves after just a few iterations. One measure of complexity is the number of line segments created at each iteration. In FIG. 21, the generator is an equilateral triangle, and the initiator consists of 4 line segments. Hence, at the th iteration, the curve contains line segments. At iterations, the Koch curve already has line segments. In FIGS. 2 and 3, the growth is even greater; at iterations, the quadratic Koch curve has line segments, while the Peano space-filling curve has line segments per subsquare subsquares connecting line segments line segments.

The inventors of the present invention have further determined that this high level of complexity provides an opportunity for compactly encoding information. If each line segment is drawn with one of two styles (different colors, different line types, etc.), then it can be treated as a single bit of information. Therefore, in accordance with one or more embodiments of the present invention, every eight line segments may then be treated as a byte representing an ASCII character. Since the line segments are drawn sequentially from the string generated by an L-system, order is preserved and can be used to encode strings of data. Using these features, one can therefore encode information directly onto the fractal curve and treat it as a barcode. To provide robustness to occlusion, data strings can be encoded multiple times on a fractal curve. Error correction can also be built-in if necessary. In addition, there are many different fractal curves that may be employed, providing various quantities of line segments at different sizes and shapes. Also, fractal curve barcodes will be robust to geometric distortion (i.e., printing on curved surfaces) since it is the sequencing of line segments that matters, not their absolute position on a grid or in a matrix. Alignment will not be an issue, as sequences can be encoded into the fractal curve to signal the beginning and end of the data string.

Kiani et al., described above, have discussed the use of fractal curves as identifiers. The invention set forth in accordance with the present application differs in several ways from their work:
- type of curve;
- encoding method;
- information extraction.

Kiani et al. only describe the use of Hilbert curves, a type of space-filling curve. The Koch curve in FIGS. 22 and 23 are examples of non-space-filling curves. The present invention encompasses any fractal curve that is non-intersecting and can be generated by an L-system. Thus, the reach of the present invention may be applied to a far greater group of fractal images.

Kiani et al propose encoding binary information by printing or not printing line segments. The inventors of the present invention had determined that at least one difficulty with this approach is that in the decoding process, it is impossible to tell whether a line segment is missing because it represents a particular encoding or if it is missing because of occlusion, damage, noise, etc. Therefore, this most important aspect means that upon acquisition of a sequence of missing line segments, it is not possible to determine whether these missing segments are intended to be missing encoding segments, or whether a portion of the image is occluded. Once this inability to differentiate is present, the identification system employing the system cannot be trusted.

The inventors in accordance with the present invention have therefore determined that it would be beneficial for all line segments in a fractal curve be printed, with multiple printing methods or other methods for differentiating between two or more types of encoding a particular line segment, so that the system is more robust to the previously mentioned reasons.

Kiani et al use a Hopfield neural network to recover the line segments from an image of a fractal curve. This requires training a computer to recognize various patterns. Various embodiments of the present invention employ line segment detection methods that do not require any training, only standard computer imaging techniques.

Still other objects and advantages of the invention will in part be obvious and will in part be apparent from the specification and drawings.

The invention accordingly comprises the several steps and the relation of one or more of such steps with respect to each of the others, and the. apparatus embodying features of construction, combinations of elements and arrangement of parts that are adapted to affect such steps, all as exemplified in the following detailed disclosure, and the scope of the invention will be indicated in the claims.

BRIEF DESCRIPTION OF THE DRAWINGS

For a more complete understanding of the invention, reference is made to the following description and accompanying drawings, in which:

FIG. 14 depicts a deterministic algorithm for the Sierpinski triangle, starting with an initial image including numbers in accordance with an embodiment of the invention;

FIG. 15 depicts a zoomed in portion of FIG. 14;

DETAILED DESCRIPTION OF THE PREFERRED EMBODIMENTS

The detailed embodiments of the invention will now be described making reference to the following drawings in which like reference numbers denote like structure or steps.

In accordance with an embodiment of the invention, an ink jet, laser marking system, or other printing or etching system may be employed in order to print a plurality of medication pills with a predetermined fractal image. Other acceptable printing systems may also be employed, and may include, by way of example only, and without limitation, laser printing, laser etching, photographic imaging, photolithography techniques, solid ink printing, or the like. One or more known edible ink products may also be employed in the printing process. Invisible, UV sensitive, heat sensitive, and other appropriate inks may be employed. Each medication pill may further be coated with a laser or other light sensitive or otherwise sensitive coatings that, when caused to react, may be employed to mark the medication pills, while remaining edible by humans. Furthermore, single or multiple color printing may be employed.

Fractal Printing

Figure 1:
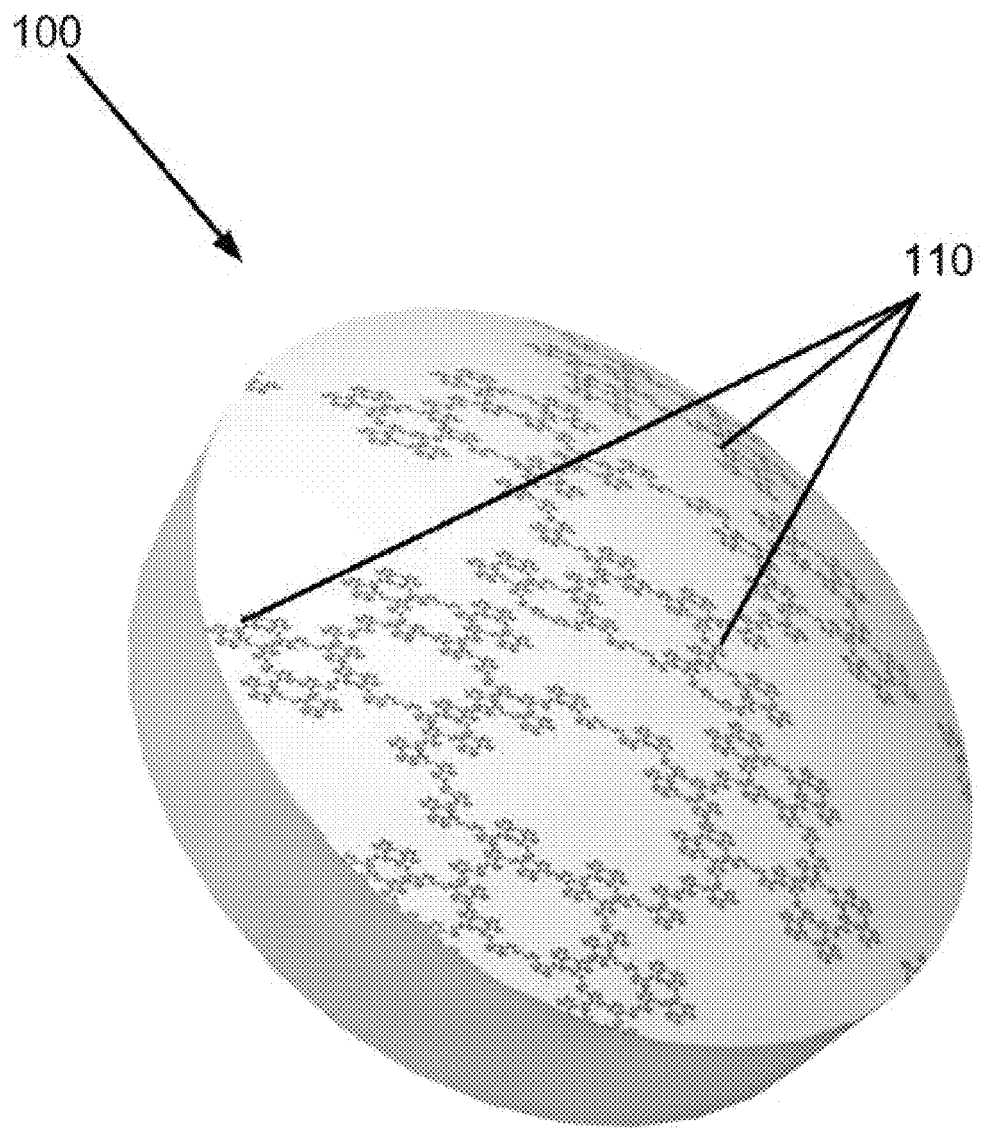
FIG. 1 depicts an exemplary medication pill with an exemplary fractal image printed thereon in accordance with an embodiment of the invention.

Referring first to FIG. 1 depicting a first embodiment of the invention, a fractal image 110 is shown printed to a medication pill 100. As is shown, the fractal image covers a substantial portion of the pill surface while possible still allowing for viewing of the pill surface based upon printing techniques, pill positioning, fractal selection, etc. fractal image 110 may cover substantially less than all of the surface of medication pill 100.

Figure 2:
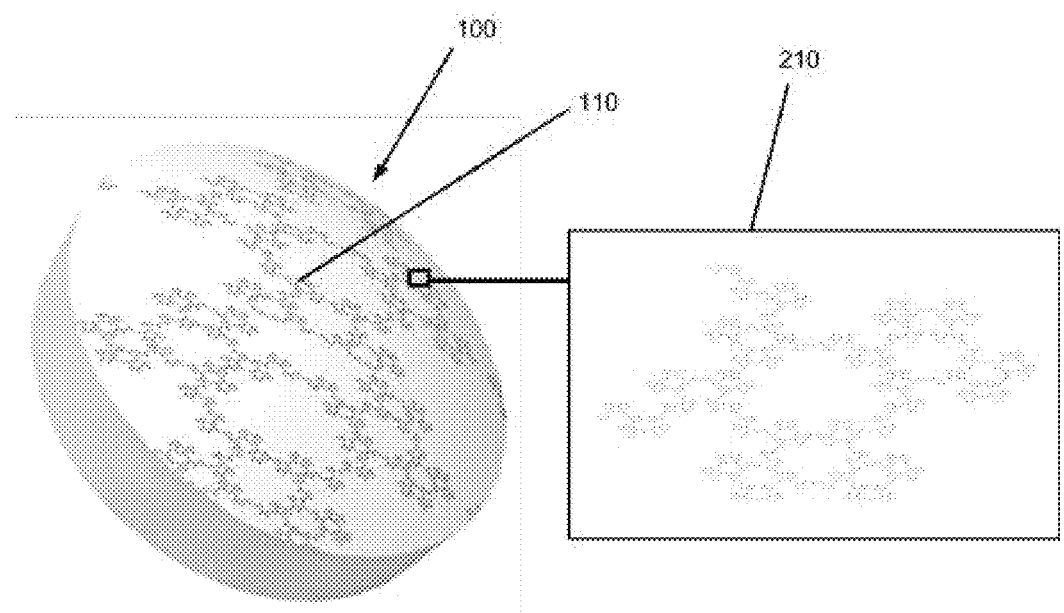
FIG. 2 depicts an increased resolution portion of the exemplary fractal image of FIG. 1.

As is further shown in FIG. 2, a fractal image 110 is once again printed to medication pill 100. Also shown is a magnified portion 210 of fractal image 110. Because of the self-similarity nature of fractal images, as can be seen, magnified portion 210 of fractal image 110 looks substantially similar to the whole of fractal 110, and is theoretically identical. This self similarity continues, theoretically, to an infinitely small printed image. Of course in practice, the levels (or dimensions) of self similarity available are limited by printing resolution, and the ability to "see" these multiple dimensions may be dependent upon an imaging resolution of an imaging device. The present invention exploits these features of reality in order to provide a varied solution applicable in different security situations.

Figure 3:
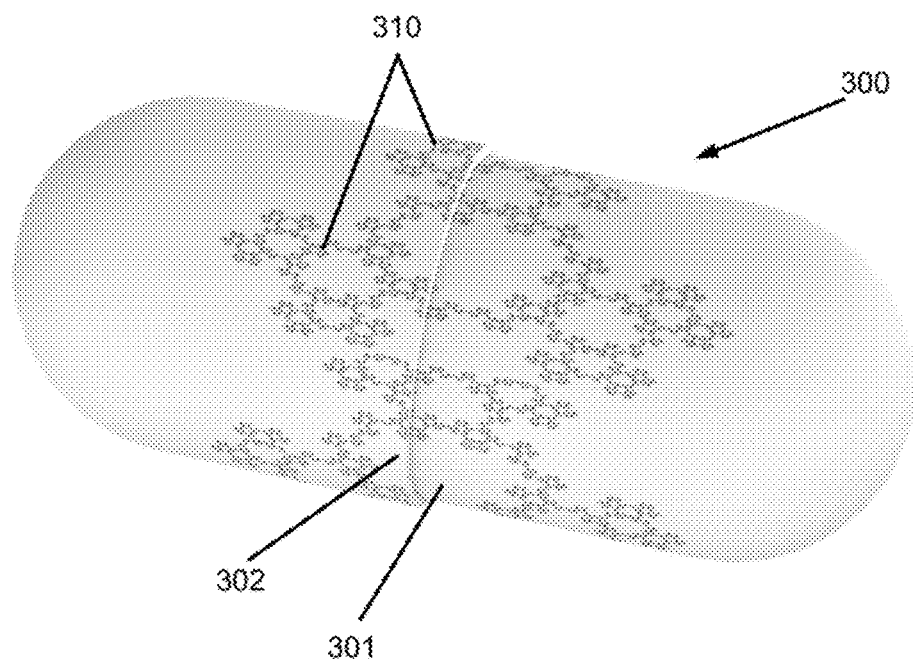
FIG. 3 depicts an exemplary medication capsule with an exemplary fractal image printed thereon in accordance with an alternative embodiment of the invention.

The printing of fractal patterns is not limited to pill-shaped medication. As is shown in FIG. 3, such a fractal image 310 may be printed to a capsule medication 300 comprising first and second capsule portions 301 and 302. When printed to such a capsule, the fractal image may take the shape of the capsule, and may be distorted thereon in a predictable manner. Furthermore, if printed after the capsule has been sealed, any discrepancy between positioning of fractal images on the capsule portions 301 and 302 may be employed to determine the possibility of the capsule having been opened or otherwise tampered with. Of course, solid capsule shaped pills may also be printed, but will not include capsule portions.

Fractal Resolution

In accordance with one or more embodiments of the present invention, the use of high resolution printing and imaging techniques may be employed when more robust security measures are required, increasing the difficulty of copying such an image, and leading to greater accuracy in identification of each item. Determinations of the maximum resolution of such printed fractals may be identified by building such fractals from a smallest possible printed pattern, thus bounding the lowest fractal resolution. Alternatively, such fractal images may be generated in a traditional form, by starting with a largest fractal image, and then dividing these larger images into smaller and smaller objects, until a predetermined limit or printing resolution is reached. Such increased resolution may also allow for more precise measurements of the details of the fractal image, such as one or more distances between various portions thereof, ratios of one or more various measured lengths or angles of various portions thereof, etc., texture of the medication pill surface, color of the medication pill surface, etc. which may then be compared to expected values to confirm authenticity and identification.

Fractal Complexity

Furthermore, various types of fractals may be employed based upon a desired level of security. Thus, more complex versions of fractal images may be employed where a more secure identification system is desired. Variations in such fractal images may include changes in angles, length, number of pixels employed, distribution of one or more characteristics or pixel density, purposeful omission of particular pixels, use of particular color combinations on a planned or randomized basis. Not only may generally more complex images be used, but a higher resolution printing process may also be employed, thus allowing for more precise printing of multiple fractal dimensions, and eventual recall and analysis of the fractal images by higher resolution imaging devices at deeper acquisition resolution. Furthermore, as noted above, combination fractals may be employed to provide additional robustness against counterfeiting, and for determining identity. These combined fractals may be particularly chosen to allow for determination of different types of information. Thus, a first or more fractals may be employed to measure for detection of distortion that may be a result of the shape of the pill, while a second or more fractals may be employed for encoding information and for prevention of replication of the fractal images. Additionally, various color gradient application may allow for the calibration of the fractal image, the pill, or other object.

Figure 8:
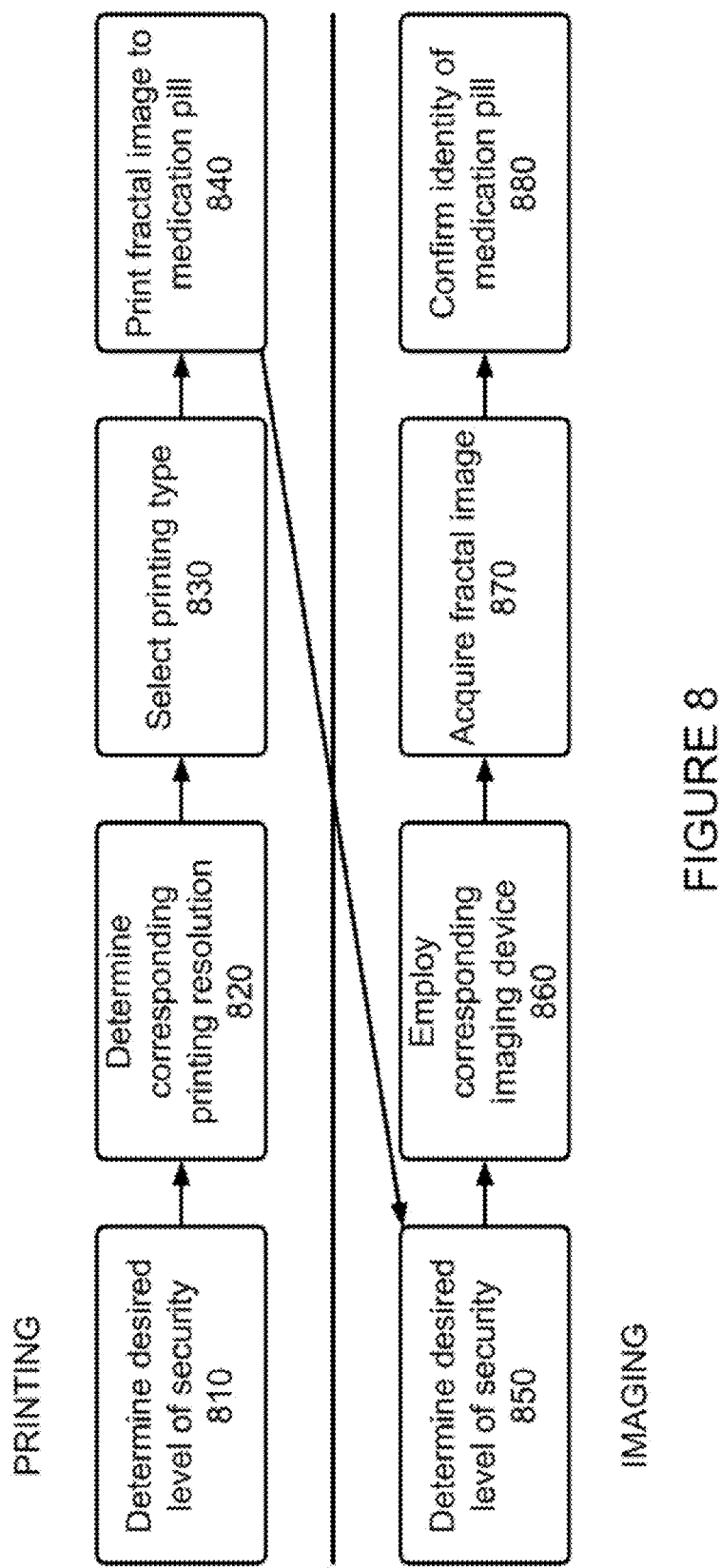
FIG. 8 is a flowchart diagram depicting a printing and imaging process in accordance with an embodiment of the invention.

Referring next to FIG. 8, in accordance with an embodiment of the invention, a desired level of security may first be defined at step 810. Then, at step 820, a corresponding necessary printing resolution may be determined, and at step 830, one or more appropriate printing technologies may be identified that will provide sufficient printing resolution to allow for the desired level of security. Finally, at step 804, a predefined fractal image is printed to the medication pill using the determined printing technology. Of course, if any of steps 810, 820 or 830 are predetermined, they can be skipped, or at a minimum, responses to these steps can be predefined.

After printing such a medication, in order to properly identify the pill, imaging steps may be employed. As is further shown in FIG. 8, a desired level of identification security may be defined at step 850, and thereafter, at step 860, a corresponding imaging apparatus may be selected. Thus, if simple visual identification by an end user or patient is desired, a webcam associated with a mobile device or the like may be employed to image a high level and one or more additional dimensions of the fractal image, even if substantially more fractal dimensions have been printed. If, however, full authoritative anti-counterfeiting identification is desired, an imaging device able to image to a much higher resolution, thus allowing for the confirmation of existence of any desired number of fractal dimensions, may be employed. Next, at step 870, the selected imaging apparatus may be used to acquire an image of the printed fractal and pill. At step 880 the identity of the medication pill may be confirmed to the desired level of security. As with printing, if predetermined, any of steps 840 and 850 may be skipped or predetermined (as if the user only has a single imaging device).

Figure 9:
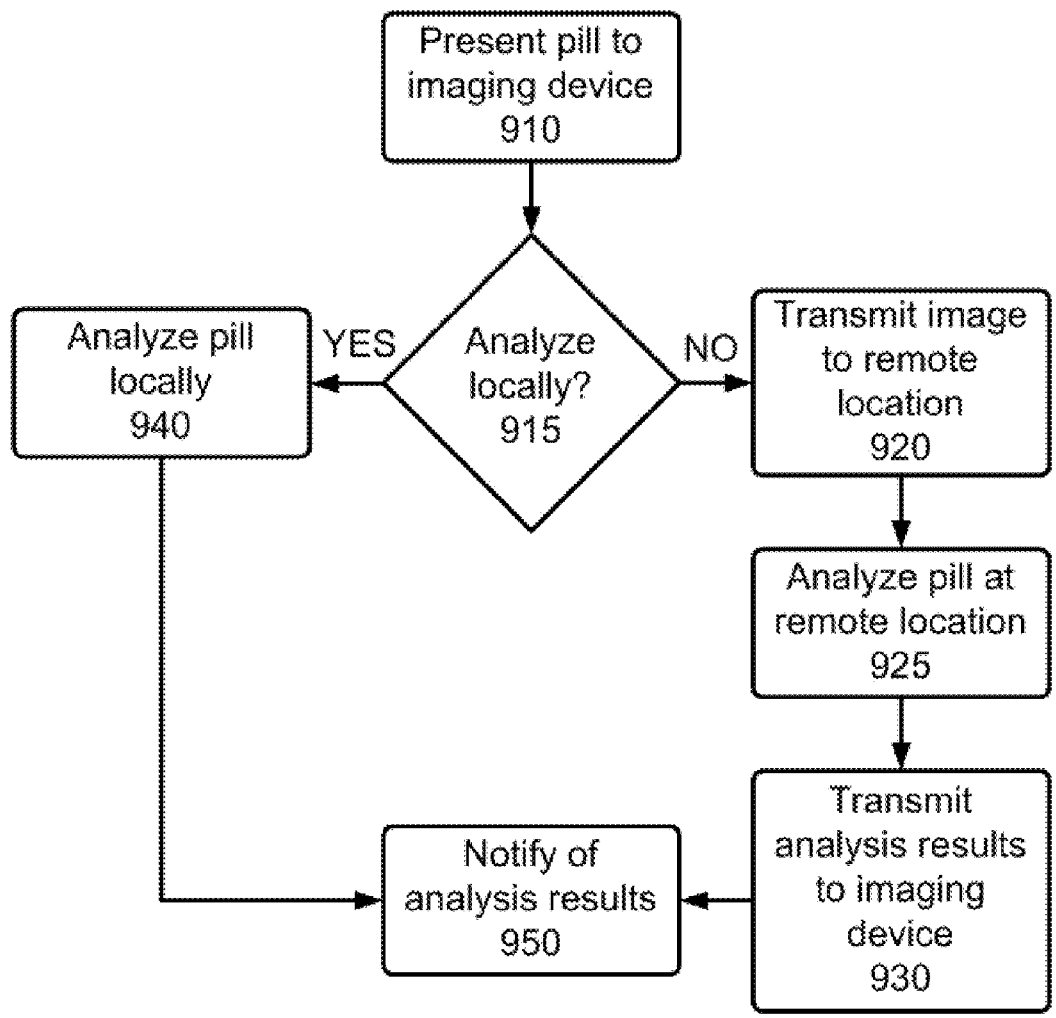
FIG. 9 is a flowchart diagram depicting image processing in accordance with an embodiment of the invention.

Thus, as is further shown in FIG. 9, user may present a medication pill with a fractal identification image printed thereon to a webcam or other more sophisticated imaging device at step 910. This device may provide local identification and confirmation of the medication, or may forward such information to a remote location for further processing, and a processing step 915 to make this determination may be employed, or such a determination may be made in advance. If local processing is not to be employed, then at step 920, an acquired image or video sequence of images may be transmitted to a remote location for processing. At step 9125, such remote processing may be performed, and at step 930, results of such processing may be returned to the imaging device. If at step 915 it is determined that local processing is to take place, then processing passes to step 940 and the pill is analyzed locally. After such analysis, the user is notified of the authenticity of the pill at step 950. The remote server or local device may analyze the imaged pill, identify the pill, and may indicate a determination of authentication or counterfeit. If counterfeit (as determined locally or remotely), the user may be instructed to not take the pill, or alternatively that the pill is authentic in conjunction with step 950.

Fractal Deformation

Figure 4:
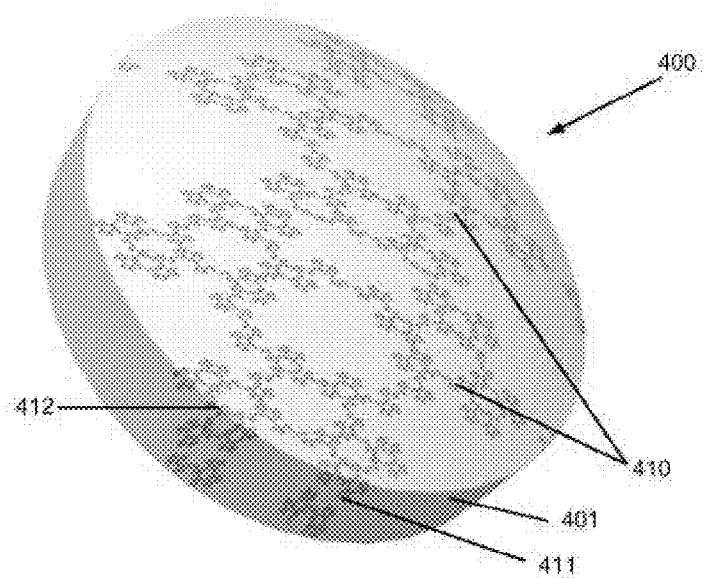
FIG. 4 depicts a distorted fractal image printed on a portion of a medication pill in accordance with yet another an embodiment of the invention.

As is next shown in FIG. 4, a fractal image 410 may be printed to a medication pill 400, and where a portion 411 of fractal image 410 may be printed on a vertical or other portion 401 of pill 400 other than a front face thereof. In this situation, portion 411 of fractal image 410 is printed over a pill feature 412, the edge. Printing over edge 412, and along vertical portion 401 will once again cause the fractal image to be distorted in a predictable manner. This predictable distortion may be used to further confirm that the pill is authentic, placing yet another barrier to a counterfeit medication.

Thus, recognition of predictable distortion of the fractal image and additional measures to avoid such copying may also be employed in accordance with various embodiments of the invention. In particular, a fractal pattern may be calibrated to include one or more of object pattern, shape, texture, markings, line thickness (such as through the use of thicker inkjet lines, or by altering a wavelength of a marking laser, for example), or the like. As noted above, by including one or more aspects of the object in the coding scheme and training an imaging system to recognize these expected fractal distortions, in order to counterfeit the object, not only must the counterfeiter precisely copy the fractal image, but must also produce an object nearly identical to the genuine object with respect to any number of attributes, any of which may pose difficulty. As is further noted above, various calibration lines or the use of symmetrical fractal patterns may be employed for distortion detection. Thus, for example, incorrect object color may change an overall color of the fractal image applied thereto, thus indicating a non-authentic object. If printing resolution is reduced based upon curvature of a pill or other object (and therefore a change in distance from the print head), ink may be distributed in a known manner, creating a unique signature and allowing for any recognition system to better determine the shape of the object more accurately. In an additional attempt to provide a difficult to copy image, as noted above, a plurality of fractal images may be overlaid on an object, thus making copying even more difficult as various interactions between the various images may be more difficult to determine.

In addition to including various features of the object in the fractal definition, these attributes may influence perception of the fractal image by an imaging system. Thus, by being printed on a curved surface, for example, a fractal image may be deformed or otherwise influenced in predictable ways, thus allowing for the user of such shape to be employed to further differentiate authentic objects. Because orientation of objects is not necessary in accordance with embodiments of this invention, deformation of such a fractal pattern may be determined in a number of likely orientations of an object, and then may be so classified and found on printed objects. Further, if orientation of the object can be controlled for printing, then precise fractal deformation may be determined. As such imaging systems may learn such expected fractal deformation, the deformation may be employed as part of the object identification system.

Fractal Coding

In accordance with one or more embodiments of the invention, information may be coded into the fractal, by placing such coding information into one or more parameters that may be stored in a parameter file used to generate the fractal. Thus, a batch number or the like may be used in the place of particular parameters to be chosen by the user. Recognition of the fractal, and reverse engineering thereof to recreate the parameter file may then provide access to the batch number or the like by the user, for example. It is anticipated that only a predetermined number of parameters may be employed for particular coding, others of the parameters being adopted to vary in a pseudo-random or other predetermined manner in order to make it more difficult to predict future likely parameter combinations. Other information that may be encoded in such a fractal may comprise one or more of Medication Name, Dose, Manufacturer, Date of Manufacture, Expiration Date, Location or the like. More personalized information may also be encoded into the fractal, including Patient Name, Prescription Regimen, Physician Name and the like. Furthermore, fractal images may be printed at manufacture, at distribution, or in combination. Thus, a manufacturer printed fractal may be provided for counterfeit prevention, while a second fractal, printed on top of the manufacturer fractal, or alongside thereof, may be provided and printed by, for example, a pharmacist or the like. These fractal images may include particular prescription, patient, prescribing doctor, date, and other patient and administration specific information. Thus, by allowing for such a combination fractal application, general and specific identification information may be provided, resulting in a robust, personalized pill marking. Additionally, it may be possible that one or the other of the manufacturer or local information may be provided by other than a fractal image. Thus, by way of example, the manufacturer information may be provided in accordance with a fractal information, while the particular patient information may be provided by a one or two dimensional barcode, or other information providing process. Of course, just the local or manufacturer fractal images may be used.

Alternatively, randomly generated fractals may be employed and recognized from a look-up table to be associated with a particular batch processing unit. Other methods may provide a library of fractal images, and indications of which fractals are to be applied to different type, shaped, or colored objects. Thus, it may be determined that a particular type of fractal image is best applied to a particularly shaped object. Next, from this subset, a further subset may be determined as best for the particular color of the object. A fractal image from this subset may then be used or encoded further, and then applied. As will be further described below, such a hierarchical selection process may also speed the eventual fractal acquisition and recognition process.

Colors may be omitted from the fractal printing process deliberately in order to increase the number of variations of the code. For example, omission of specific areas may indicate batch number or date. Furthermore, a range of colors may be included with absolute colors such as black, white, etc. acting as reference points. Use of such a range of colors allows for more patterns to be created and utilized, thus increasing a range of possible unique fractal images. Selection and/or omission of particular pixels in such a fractal image may be further used for variation to allow for randomization of predetermined fractal images.

In accordance with an embodiment of the invention, one may embed codes into the fractal image that are distributed that can be properly resolved and interpreted up in reasonable lighting conditions by a low resolution camera. If higher resolution is available in the fractal images, but cannot be precisely determined by the low resolution camera, that low resolution camera may further be employed to determine likely distributions of color or shape across such a fractal that, while perhaps not being precisely distinctive, do provide an additional level of security above the simply lower resolution components of the fractal image. Since these patterns are replicated, the system may decision fuse multiple instances of the same uncertain distribution to come up with a much higher probability of confirmation.

Printing Techniques

Figure 5:
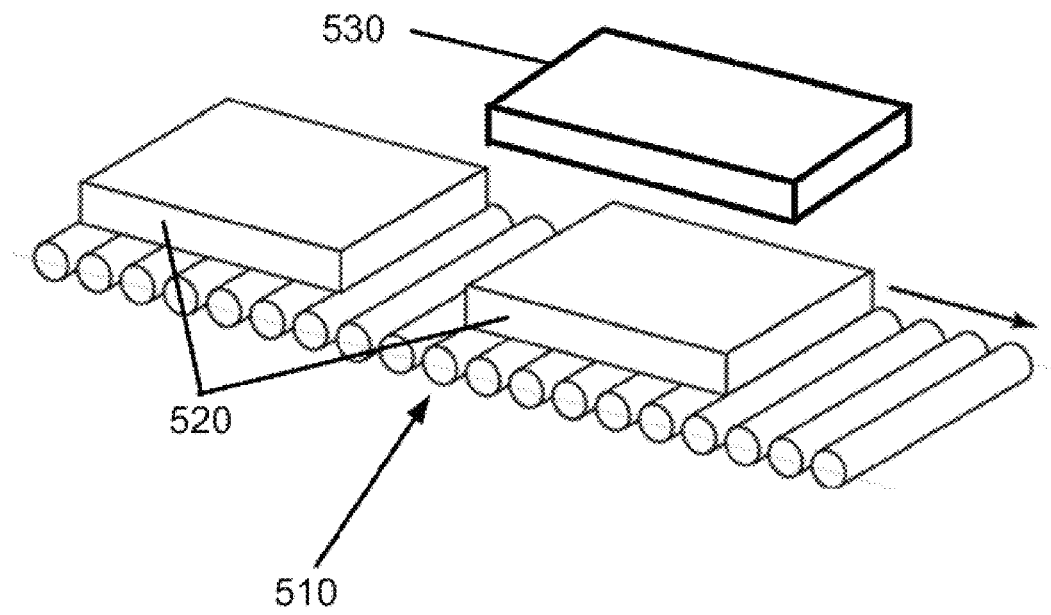
FIG. 5 depicts a conveyer system for conveying batch processing groups of objects for processing in accordance with an embodiment of the invention.

Referring next to FIG. 5, in accordance with an embodiment of the invention, a conveyer mechanism 510 is shown forwarding one or more batch processing units 520. Conveyer mechanism 510 is shown as a gravity-fed mechanism including a plurality of rollers, but any such conveyer system may be employed, including gravity-fed, belt driven or otherwise powered conveyer systems, and may further be provided with or without a belt system for conveying the batch processing units 520. Of course, any method for forwarding the batch processing elements, including hand delivery of the units, may be employed. Further, conveyer mechanism 520 may comprise any desired method, apparatus or system for placing one or more objects in a location to be imaged in a manner as will be described below.

Figure 6:
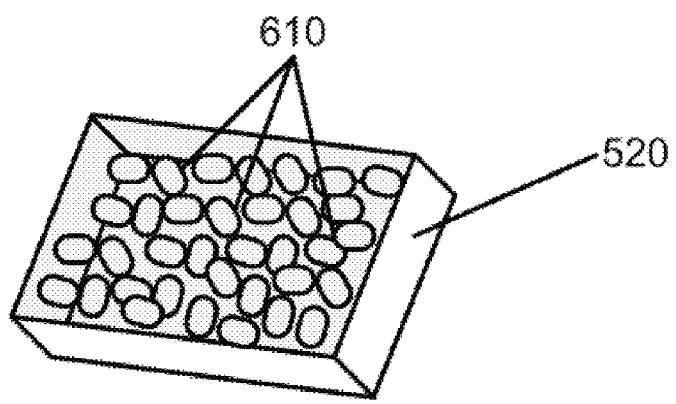
FIG. 6 depicts a group of pills for batch processing in accordance with another embodiment of the invention.

It is contemplated in accordance with one or more embodiments of the invention that each batch processing unit 520 contain a plurality of individual objects, and in accordance with a preferred embodiment of the invention, a plurality of medication pills or the like. Such a plurality of medication pills 610 are shown in FIG. 6. As shown, medication pills 610 are preferably arranged in batch processing unit 520 in an unstructured manner, but generally in a single layer. While slight overlap may be tolerable in accordance with the invention, a single layer presentation of the medication pills will allow for maximum exposure of the pills to an imaging apparatus, shown at 530 in FIG. 1. Such a batch processing unit may comprise from one to any number of properly physically locatable pills, and may further comprise a physical structure for holding the pills, or may simply comprise a conveyer or other forwarding or holding mechanism for presenting the one or more pills to a printing mechanism. Thus, as batch processing unit 520 is properly positioned below imaging apparatus 530, imaging apparatus is employed to administer a predetermined fractal image to the plurality of medication pills 610 at one time. Such printing may comprise a raster printing system, or may print or otherwise transfer a complete image to the plurality of medication pills substantially simultaneously. As will be apparent, each medication pill 610 will be printed with a portion of the predetermined fractal image. As noted above, because of the self replicating property of fractal images, these portions will include sufficient information to allow for proper identification of various fractal dimensions at various desired imaging resolutions, thus providing unique flexibility in imaging based upon desired security levels.

Figure 7:
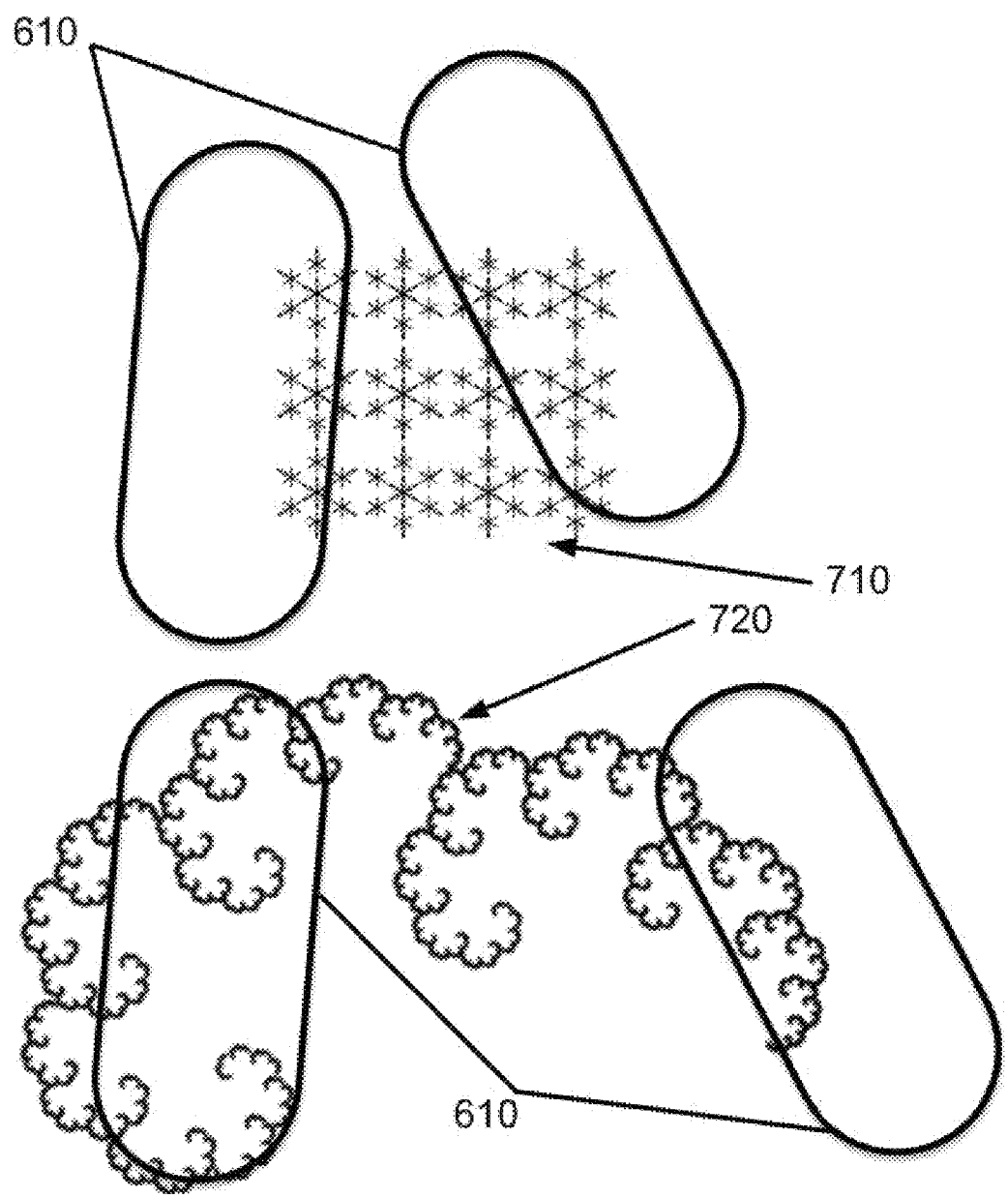
FIG. 7 depicts application of different fractal patterns to a group of medication pills in accordance with an embodiment of the invention.

Thus, as is shown in FIG. 7, each medication pill 610 is preferably forwarded for processing to have a fractal pattern imparted thereon. Such a fractal pattern may comprise a repetitive pattern 710, a continuous pattern 720, or other desired fractal image. Each may be used in either a batch processing or continuous processing situation. Such fractal patterns may further comprise one or more combination fractal patterns, in which two or more fractal patterns are combined to provide a resulting complex fractal pattern. These complex patterns may be combined before printing, thus imparting the complex fractal pattern in a single printing pass, or alternatively, each pattern may be printed in a separate pass, thus layering the two or more individual fractals to provide a resulting complex fractal image.

It may further be desirable to determine where the one or more pills or other objects are located in a single dimension (when printing is in accordance with a raster type mechanism) or in a two dimensional arrangement (such as a screen printing system or the like). In such a manner, ink may only be applied where such objects are present, thus saving ink and improving longevity of the system. Furthermore, by determining location of objects, and thus potentially batch size, particular fractal images may be employed that are properly suited to such batch size or arrangement of objects.

In addition to employing the batch processing method of FIGS. 5 and 6, a continuous processing system may also be employed. In such a system, a similar conveyer belt may be employed, in which medication pills or other objects are continuously passed beneath imaging apparatus 530, and may preferably be employed in conjunction with a continuous manufacturing process of such objects. A fractal pattern may preferably be chosen that may be continuously replicated in a direction of travel of the medication pills, while being bounded in the direction across travel, or may be easily repeated in the direction of travel so all medication pills or other objects are printed with at least a portion of the fractal pattern.

Hardware Signature

It has been determined by the inventors of the present invention that a particular image processing apparatus 530 may affect how the printing ink is distributed on the surface of the medication pill or other object, thus, in combination with the printed fractal pattern, producing a printer signature, i.e. a printer specific rendering of the particular fractal pattern. The particular characteristics of the printer, including nozzle tolerance, humidity and a host of other factors may influence an output fractal image. Such a printer signature may be further used as an identifying feature of the printed fractal image. Such a signature may be similarly determined when other imaging techniques, such as those described above, are employed.

This idea of printer signature may also be extended to product signature and camera (or more broadly, imaging apparatus) signature. For example, a product signature may be based at least in part on how the product absorbs the ink, how the pattern at higher resolution distributes the ink, texture and reflectivity of the object, shape of the object, etc. Unique texture, shape, color specific to the object (pill) will "code" or distort the fractal into a unique ID. A camera or other imaging apparatus used to eventually image the printed fractal image may also have a unique signature in distorting the fractal image that may also act as an increase in security as it may be difficult to anticipate a camera that is to be used for imaging, if not an authentic system. These signatures, as opposed to being deficiencies of the system, may be embraced to strengthen the robustness of the system. Such image influences resulting from unrelated characteristics of systems used to implement the system will be difficult/impossible to replicate. Through a decision fusion process combining the results of analysis of any one or more of these attributes, an overall picture and confidence of authenticity or counterfeit may be determined.

Thus, the different hardware and pill interaction signatures, including shape, texture, color of the object, or the like will all help to further "code" or distort the fractal in a unique way. Hence, the unique attributes of the product/item will help to create a unique fingerprint for the fractal. The inventive system is therefore able to learn the unique characteristics of the product through computer vision training or the like, and not simply apply an out-of-context code to the item.

At higher resolutions of inkjet printing or other printing, marking or etching processes, codes may be embedded that higher resolution cameras are able to read as well. In the event that inkjet printers can no longer print at a high enough resolution, then feathering or expected feathering distribution may also be picked up based on a distribution that may be unique to the printer (printer's signature). Alternatively, other higher resolution printing or etching techniques may be employed. In the event that a particular camera, such as a webcam or the like, does not have sufficiently high resolution for acquisition of a particular fractal image, then expected blurring patterns may be read. This blurring pattern may therefore be provided as a signature in itself, and may be learned through computer vision and machine learning or the like by teaching with the lower resolution camera. Multiple instances of the feathering signature may suggest likelihood of identification. Any such recognition system may rely on confidence levels of detection and confirmation. Thus, even if identification is confirmed, a threshold may determine confidence over suspicion of counterfeit (i.e. how confident the system is that the item is authentic). Many instances of low confidence levels (even if above threshold levels), as received and accumulated over time from any number of different users at a centralized location, may indicate a potential counterfeit issue and raise a flag remotely to anti-counterfeit authorities to double check a medication source, or alert a user to report the possibility of a counterfeit medication source.

When printing, and thereafter requesting image acquisition, at higher levels of resolution, the actual printing method may be employed to code information when continuous lines or images may not be able to be printed at these higher resolutions. For example, in the case of inkjet dots at very high resolution, the relative positioning of the inkjet dots may be changed, in order to be arranged, for instance, in a form of a proximity to a center of some printed object or other marker or attribute. Thus, similar to notes on a scale, these same dots may be use to allow for the encoding information even in cases when only low printing resolution is available, but high magnification image acquisition may be available when the pill or object is to be identified.

Robust Imaging Solution

As noted above, in all cases, because of the inherent replicability of fractal images, the solution is effective even if only part of the fractal is printed on the pill. By the nature of fractals, any encoded ID is repeated within the shape. Similarly, when reading, if part of the fractal is obscured or otherwise unreadable, the ID may still be determined. Many varieties of data can be encoded in the fractal (date, time, batch number, location, manufacturer, dose, item etc). Furthermore, writing or reading of the fractal image does not require alignment of the object perfectly as only part of the fractal may be good enough (may need a percentage of the fractal to be printed on a surface for a specific webcam resolution and inkjet resolution).

Upon reading of a printed fractal identification image through the user of a standard barcode laser scanning device, image acquisition, or other method for reading information from the surface of the medication pill, various reference points may be used to aid in determining authenticity. Upon the determination of one or more of such reference points preferably defined by one or more of a pattern, color, combination thereof or the like in a fractal image, distances and ratios to other reference points may be determined and used to confirm authenticity, or a level of confidence in that authenticity, in a manner as described above. Thus, an object may be scanned, and existence of at least a portion of such a fractal may be determined. If there is enough information in the portion of the fractal image to confirm identity, then identity is confirmed. If however, not enough information is available, various pieces of fractal images may be pieced together to determine enough information. Alternatively, an occlusion or the like may be effectively disregarded through such piecing together of the fractal image. Such information to be pieced together may be taken from one or multiple fractal dimensions. Further, a user may be instructed to bring such an object closer to an imaging apparatus (or otherwise zoom in on the object), or be asked to switch to another medication pill for re-identification, in order to improve capture resolution. This may be particularly important in difficult imaging environments, such as in the existence of bad lighting conditions or the like, which may reduce a confidence of precision of imaging. Such improved resolution may be employed alone, or in conjunction with anticipated effects from one or more object attributes, as noted above, in order to identify an authentic printed fractal image.

Any applicable imaging system, such as a high resolution system, or a webcam system, will benefit greatly over the use of barcoding. As orientation of the medication pill is not important, imaging of the fractal image can be performed at any angle of the pill. Furthermore, in accordance with various embodiments of the invention, various augmented reality solutions may be employed in order to properly image the medication pill and fractal image, thus truly freeing up the user to image the fractal image without any real issues regarding orientation or placement of the pill. Such augmented reality solutions may also provide additional information regarding the medication pill, including patient name, medication administration schedule information, prescribing doctor's name, contact information, or any other information that may be useful for the user to view.

Counterfeit Mapping

Once an authentication, or counterfeit is determined, such information may be provided to a remote location to accumulate such information. Each pill identification instance will result in an authenticity confidence score. With the user's consent, instances of low authenticity confidence may be reported to a centralized location, along with a medication image, GPS data, as well as time and date stamps. Higher-level authentication tests may be carried out at local pharmacies using higher resolution imaging devices. When sufficient notifications of potential counterfeit medications have accumulated (confidence flags), a geographic nexus of particular counterfeits will be determined alongside likely illegal distribution channels, thereby aiding anti-counterfeit officials. Thus, if a high concentration of counterfeit items is found in a location, investigations may be employed in that area. Further, proper identifications can be confirmed. Variation in batch coded information may be employed in order to further allow for confirmation of particular medication generation time and location stamps. Such information may be forwarded over the Internet or other transmission system, such as transmission over a cellular telephone connection or the like, to a centralized location for analysis and accumulation, for example.

Fractal Pattern Selection

Selection of the actual patterns to be employed may be performed in accordance with consideration of one or more parameters to be encoded into the fractal image, and further based upon a surface or medication pill upon which the fractal image is to be printed. As different information may be encoded into each fractal pattern, the selection and encoding of this information will make changes to the fractal pattern in subtle manners. Based upon a printing surface, expected distortion, amount and type of information to be encoded, printing technology to be employed, or level of resolution in printing and imaging desired, different fractal patterns may be preferred and employed. In fact, each such printed fractal provides a multi-dimensional pattern that comprises the above noted fractal signature. These dimensions may include one or more of fractal image, texture of the surface, color of the medication pill and shape and contours of the medication pill. These features may be employed to aid in object recognition.

Furthermore, selection of particular types of base patterns (to be modified by coding) may be performed in accordance with one or more particular tasks, pills or desired results. Thus, for example, one or more simple fractal patterns, such as a Cantor fractal patterns may be employed or lower security situations where identification is most important. More complex types of fractal base images may be employed for other, security intense applications.

Image Analysis

For images of objects with a fractal pattern printed on them, computer vision techniques may be used to analyze the image. Image analysis may incorporate such techniques as global and local feature detection and description, histogram analysis, image thresholding, image segmentation, etc. Global features may include shape, contours, image moments, object/pattern orientation, etc. Local features may include corners, blobs, line segments, gradients, keypoints, anchor points, etc. The information extracted at this stage may then be used for comparison between test images and stored images. The information may be compared in various ways, including the use of feature vectors.

Fractal Features

Figure 12:
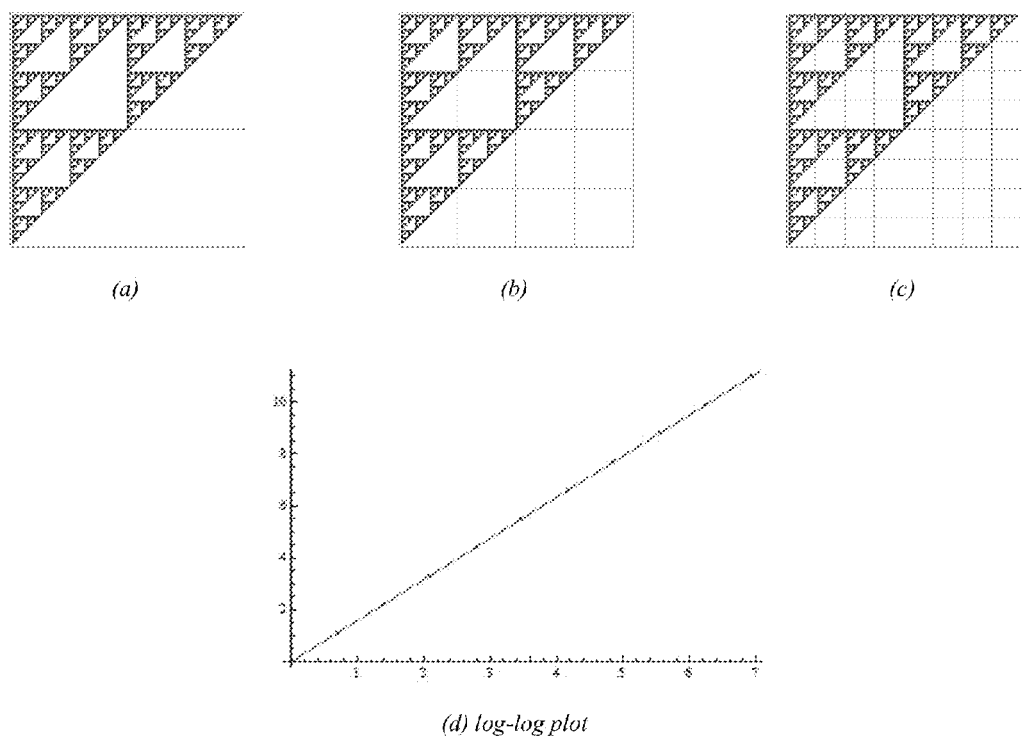
FIG. 12 illustrates a computation of box counting method for the Sierpinski triangle in accordance with an embodiment of the invention.

One way fractals are distinguished from regular geometric patterns is by their non-integer dimension. For example, the Sierpinski triangle, a well-known fractal, has dimension ≈1.585. The main definition of fractal dimension is known as Hausdorff dimension, which requires computing an infinum over all possible coverings of a fractal by small sets. Since this covering cannot typically be computed in practice, fractal dimension is usually estimated J. Theiler, "Estimating fractal dimension," *J. Opt. Soc. Am. A* 7, 6 (1990), pp. 1055-1073. Commonly used estimators of dimension are the box-counting dimension and the correlation dimension. Both of these are instances of generalized dimension:

$$D_q = \frac{1}{1-q} \lim_{r \to 0} \frac{\log \sum_i P_i^q}{\log r},$$

where r is the side-length of the boxes of a grid covering the attractor and $P_i = \mu(B_i)/\mu(A)$ is the normalized measure of the ith box $B_2$. $P_i$ is usually estimated by counting the number of points of the attractor in the ith box and dividing by the total number of points. Setting q=0 corresponds to the box-counting dimension while setting q=2 corresponds to the correlation dimension. FIG. 12 illustrates the computation of the box-counting method for the Sierpinski triangle. In accordance with such computation, the attractor is successively covered with grids of boxes of decreasing size (as shown in portions a-c of FIG. 12. For each such grid, the number of boxes that contain a part of the attractor is counted, and the (box-size ti number of boxes) pairs are plotted on a log-log plot, shown in portion d of FIG. 12. The slope of the regression line in this particular instance is calculated as 1.58496.

Therefore, in accordance with one or more embodiments of the present invention, fractal dimension estimation of an image to be tested may be implemented in the following manner:

1) Extract fractal from a given test image: The test image may be provided from any standard camera, such as on cellphones or tablet pc's. Any preprocessing of the image (thresholding, rotation, perspective transformations, Gaussian filters, Laplace filters, etc.) may be implemented here. The image may be applied to any desirable surface, in accordance with the invention, and may in particular be applied to a medication pill or other object for which authentication or identification is desired.

2) Apply the box-counting algorithm: The sizes r will typically range from L/2 to 1, where L is the side length of the image.

3) Compare the results of the algorithm to results from stored images: The results calculated in step 2 are preferably compared to results in a list of possible IFS fractals, and the IFS code with the closest fractal dimension is selected. Such a list of possible fractals are preferably printed, and this same calculation is performed for each, thus generating a table of dimension values for different fractal images that may be applied to an object or otherwise printed in accordance with one or more embodiments of the invention. A stored dimension value that is closest to the measured and determined fractal value is preferably indicated as the matching fractal. Additionally, in accordance with one or more embodiments of the present invention, a user-defined threshold may preferably be implemented so that if the difference between the computed dimension and expected dimension exceeds the threshold, then no IFS code may be selected from the database and a null value is preferably returned. The addition of this threshold makes sure that only close images may be considered, and provides a level of confidence that there is an actual match between the computed dimension of the images fractal image, and the expected dimension of one of the stored fractal images.

In accordance with an additional embodiment of the invention, an inventive lacunarity analysis may be implemented to determine fractal dimension when the image being analyzed is a fractal. Lacunarity may be estimated by a gliding-box algorithm. C. Allain \& M. Cloitre, "Characterizing the lacunarity of random and deterministic fractal sets," *Physical Review A* 44, 6 (1991), pp. 3552-3558. Such a gliding box algorithm provides that for each pixel pin an image, a box of radius r is preferably centered at p, and the number of pixels s in the box which are part of the fractal pattern is counted. This creates a frequency distribution n(s, r) which is the number of boxes of size r with s pixels. After computing n(s, r) for each p and for several box sizes r, the frequency distributions may be converted into probability distributions Q(s, r) by dividing by the total number of boxes N(r) of size r. The first and second moments may then be computed as $$Z^1(r) = \sum_s s Q(s, r)$$

-continued $$Z^2(r) = \sum_s s^2 Q(s, r),$$

and lacunarity at scale r is then preferably defined as $$\Lambda(r) = \frac{Z^2(r)}{[Z^1(r)]^2}.$$

For fractal patterns, in accordance with this embodiment of the invention, plotting log r vs. log Λ(r) yields a curve which is a straight line with slope m=D–E, where D is the fractal dimension and E is the Euclidean dimension.

Therefore in accordance with one or more embodiments of the present invention, lacunarity estimation of a test image may be implemented in the following manner:

1) Extract fractal from a given test image: The test image can be provided from any standard camera, such as on cellphones or tablet pc's. Any preprocessing of the image (thresholding, rotation, perspective transformations, etc.) will be implemented here. The image may be applied to any desirable surface, in accordance with the invention, and may in particular be applied to a medication pill or other object for which authentication or identification is desired.

2) Apply the gliding-box algorithm: The scales r will typically range from 1 to L/2, where L is the side length of the image.

3) Compare the results of the algorithm to results from stored images: The results calculated in step 2 are compared to the results in a list of possible IFS fractals, and the IFS code with the closest lacunarity is selected. Such a list of possible fractals are preferably printed, and this same calculation is performed for each, thus generating a table of lacunarity values for different fractal images that may be applied to an object or otherwise printed in accordance with one or more embodiments of the invention. A stored lacunarity value that is closest to the measured and determined lacunarity value is preferably indicated as the matching fractal. Additionally, in accordance with one or more embodiments of the present invention, a user-defined threshold may preferably be implemented so that if the difference between the computed lacunarity and expected lacunarity exceeds the threshold, then no IFS code may be selected from the database and a null value is preferably returned. The addition of this threshold makes sure that only close images may be considered, and provides a level of confidence that there is an actual match between the computed lacunarity of the images fractal image, and the expected lacunarity of one of the stored fractal images.

As lacunarity may be alignment dependent, depending on the fractal image employed, a method for aligning such a fractal image may be employed. Thus, in accordance with one or more embodiments of the present invention, alignment points may be provided to allow for such alignment. These alignment points may be provided as part of the fractal image (comprising a modification thereof), or may be printed on top of the fractal image to indicate alignment. As alignment is preferred, this lacunarity step may be used alone or in conjunction with the dimension calculation described above to determine a matching fractal.

Multi-Fractal Spectrum

To create a feature vector of fractal dimensions, the method described in the previous section regarding the computation of generalized fractal dimension may be implemented for a user-defined range of values of q, including non-integer values. A Legendre transform may then be applied to these values β(q), $$f(\alpha(q)) = q\alpha(q) - \beta(q),$$

where $$\alpha(q) = \frac{d\beta(q)}{dq}.$$

The resulting (α(q), ƒ(α(q))) pairs then form a multi-fractal spectrum for a user-defined range of α's that may then be used to analyze and compare images of fractals. K. Falconer, *Fractal Geometry* (Wiley, West Sussex, England, 2003); Y. Xu, H. Ji, \& C. Fermuller, "A projective invariant for textures," Computer Vision and Pattern Recognition 2 (2006), pp. 1932-1939. [4, 9].

Evaluation of a Test Image

Evaluating a test image against a stored image using both image analysis and fractal features requires combining information in a manner that allows for robust comparison. This process is known as information fusion (A. Ross \& A. Jain, "Information fusion in biometrics," *Pattern Recognition Letters* 24 (2003), pp. 2115-2125), and may be implemented at three levels in accordance with one or more embodiments of the invention.

1) at the feature extraction level,
2) at the matching score level,
3) at the decision level.

At the feature extraction level, feature vectors generated from image analysis and fractal features are preferably combined to form a single feature vector to be used in comparison. At the matching score level, image analysis feature vectors from test images may be compared to image analysis feature vectors of stored images, fractal feature vectors from test images may be compared to fractal feature vectors of stored images, and the scores from the two comparisons are preferably combined. At the decision level, feature vectors may be classified as accepted or rejected based on user-defined criteria, with a final decision being made on the various decisions. Any of the extracted fractal images may employ a look up table, locally or remotely online, to determine or otherwise classify the extracted features or otherwise stored images.

In accordance with still further embodiments of the invention, to gain better accuracy in evaluation and/or to speed up the process, information selection—using some but not all of the gathered information—may be implemented. Information may be selected using bootstrapping, boosting, machine learning, or other processes.

Multi-Resolution

As noted in above, fractals exhibit self-similarity at multiple scales. Therefore, in accordance with embodiments of the present invention, this self-similarity may be leveraged by implementing any of the previously described algorithms or techniques at multiple resolutions, i.e., capturing an image at multiple resolutions, filtering an image, resizing an image, etc. The information gathered at each resolution level may be compared to detect the level of self-similarity. This information may be used for both identification and verification purposes. It is these multiple levels of resolution capture that may provide additional robustness in the image capture process. Using multi-resolution can speed up the processing. The algorithm may preferably be designed in a cascaded manner, including the ability to first check low resolution. If there is a recognition failure (i.e. a wrong identification is confirmed), processing may stop. If a wrong identification cannot be confirmed, or if more information is necessary, a higher resolution level may then be considered, and so on. Further, such multi-resolution is robust to occlusion. Any information missing at a lower resolution may be available at a higher resolution because of self-similarity.

By employing such multi resolution systems, situations where precise identification and authentication may be required may print such images to very small levels of resolution, even requiring a microscope or the like to read the images. A continuous zooming mechanism may be employed in order to continuously check the fractal pattern at the different levels for consistency. Indeed, different imaging devices may be employed in order to read these images at the different resolutions. Such a reading requirement, and the precision printing required, act to raise the bar for a counterfeit printing process. Merely copying an image may be difficult, and may not result in sufficient printing precision at the various resolutions. Determining a mathematical equation used to generate a fractal image may not be possible simply by viewing the fractal image, and thus, printing an image from the mathematical equation may be always more precise than copying an image. This differential may provide a method for always ensuring that an authentic image is able to be resolved a higher zoom levels than a copied image.

Super Resolution

Fractals analysis or high security analysis may require high resolution images. However, consumer level cameras have limited capability in resolution, which may result in low resolution images. In accordance with an embodiment of the present invention, this problem may be solved by taking advantage of multiple frames using super resolution techniques. Super-resolution is a technique to use multiple frames of the same object to achieve a higher resolution image. It works only if the frames are shifted by fractions of a pixel from each other. The super-resolution algorithm is able to produce a larger image that contains the information in the smaller original frames. Therefore, by imaging multiple frames shifted in position slightly from each other, and combining these frames employing super resolution techniques, a higher resolution image may be obtained for use in accordance with the various embodiments of the invention.

Image Quality

A major issue in computer vision is the environment in which image capture is taking place, and how any environmental factors affect image quality. The quality of an image can be influenced by any number of environmental factors. These environmental factors may include lighting, camera resolution, printer quality, capturing methods, camera angle, distance to camera, etc. Any previously described algorithm or technique or the information gathered from those algorithms or techniques may be adjusted to account for environmental factors. This adjustment may include filtering images before analysis, adjusting the algorithms or techniques, weighting of information, etc. Image quality may be estimated both at a global level and a local level.

Once an overall image quality has been determined, it is possible to perform one or more of the following processes on the captured data:

1) reject very low quality samples and guide the user or select the best samples from consecutive frames. Or alternatively, recognize that some printing devices or imaging devices may produce lower resolution images. In these situations, it may be desirable to include special alignment or other points into the fractal images that may be tested to further determine authenticity. Therefore, in accordance with this particular embodiment of the invention, when an image of low resolution or low quality is acquired, the special printed points may be employed to further detect patterns within the fractal image. Similar to fingerprint analysis, each pattern can be viewed as a special point. Then the problem of identification and authentication becomes in part a point matching problem. These special points may also be used in identifying or authenticating higher resolution images. If a high quality image is "zoomed in", these special points (or smaller patterns) may be detected within each fractal image pattern each pattern. In such a situation similar to the lower resolution problem, in addition to the use of the fractal calculations described above, identification and authentication becomes in part a larger scale point matching problem, which make the system more complex robust and accuracy.

In order to solve such a point matching problem, many approaches may be used in accordance with various embodiments of the invention. These approaches may preferably include one or more of the following: algebraic geometry, including using the information of absolute or relative positions between two points, absolute distance or relative distance, i.e count how many points/patterns between two special points to reduce the computation burden, the absolute or relative directions of points; Hough transform; relaxation; and energy minimization.

2) isolate regions with low quality and analyze regions with good quality. Because of the self similarity and repeatability of fractal images, it is possible to determine portions of an image that provide a higher resolution of information, and process these portions of the image. Thus, in accordance with various embodiments of the invention, it is possible to identify one or more desirable portions of an image related to image quality, and process these portions of an image. Furthermore, selective image portion processing may be employed not only for image resolution, but also certain portions may be provided with different colors, allowing for color filters or other color selection tools to allow for processing of the different portions of the image by different devices, and have these portions isolated and separately processed.

3) adapt matching strategy based on quality

4) Assign different weights to information (features, matching scores and etc.) based on quality.

Transformation of Fractals

Figure 13:
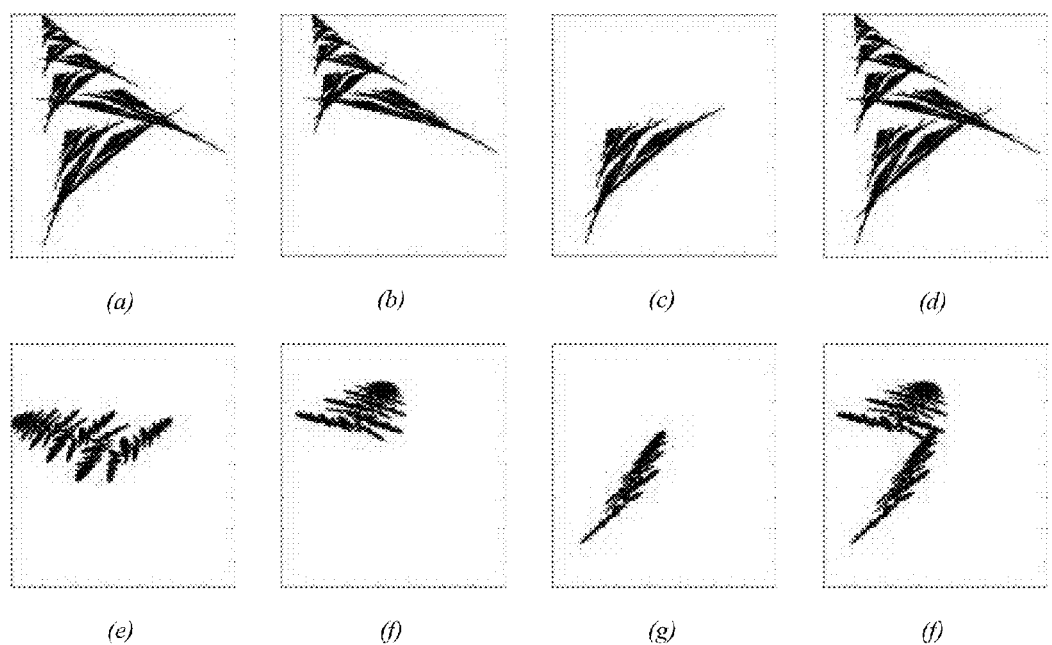
FIG. 13 depicts application of an IFS to different fractals in accordance with an embodiment of the invention.

The attractor equation noted above stated that a fractal is the fixed point of an IFS, i.e., it is unchanged when the IFS is applied to it. This process can be observed in FIG. 13. In FIG. 13, portions (a) and (e) display two different fractals, $A_1$ and $A_2$. When the $S_i$'s of $A_1$ are applied to both fractals, $A_1$ remains unchanged, but $A_2$ is clearly different. Thus, as is shown, portion (b) comprises a single transformation $S_1$ applied to $A_1$, portion (c) comprises a second transformation $S_2$ applied to $A_1$, and portion (d) comprises the union of portions (b) and (c). Similarly, portions (f), (g), and (h) comprise the application of the same transformations, but to a different fractal. As is clear from this image, when the various transformations are applied to the corresponding fractal, the images do not change, other than to change position. But, when the same various transformations are applied to a non-corresponding fractal, the fractal images change substantially, in addition to changing position.

In accordance with an embodiment of the invention this process can be implemented to form an identification system for fractal images based on transforming them by the contraction mappings of an IFS. A query image q may be tested against a set R of reference images of fractals by transforming q by the $S_i$'s of each r∈R. The change from q to S(q) may be measured for each r (any measurement may be user-defined, though the Euclidean norm is the standard method), and the reference image that resulted in the minimum change may be selected as the closest match. A user-defined threshold t for the distance measurement may be implemented, so that if $\min(d_i) > t$, q is rejected as not being in R.

Information Scaling

The deterministic algorithm for displaying fractals described above, combined with the ability of laser marking technology to print highly detailed images at extremely small sizes, provides an inventive method for printing information at various scales within a fractal in accordance with various embodiments of the invention. This method preferably employs a subset of fractals which satisfy the open-set condition, i.e., fractals defined by an IFS with contractions $S=\{S_1, S_2, \ldots, S_m\}$, $m \geq 2$, where, given an open set O, the contractions satisfy the following two conditions:

$$\bigcup_{i=1}^{m} S_i(O) \subset O,$$

$$S_i(O) \cap S_j(O) = \emptyset \text{ if } i \neq j.$$

Figure 10:
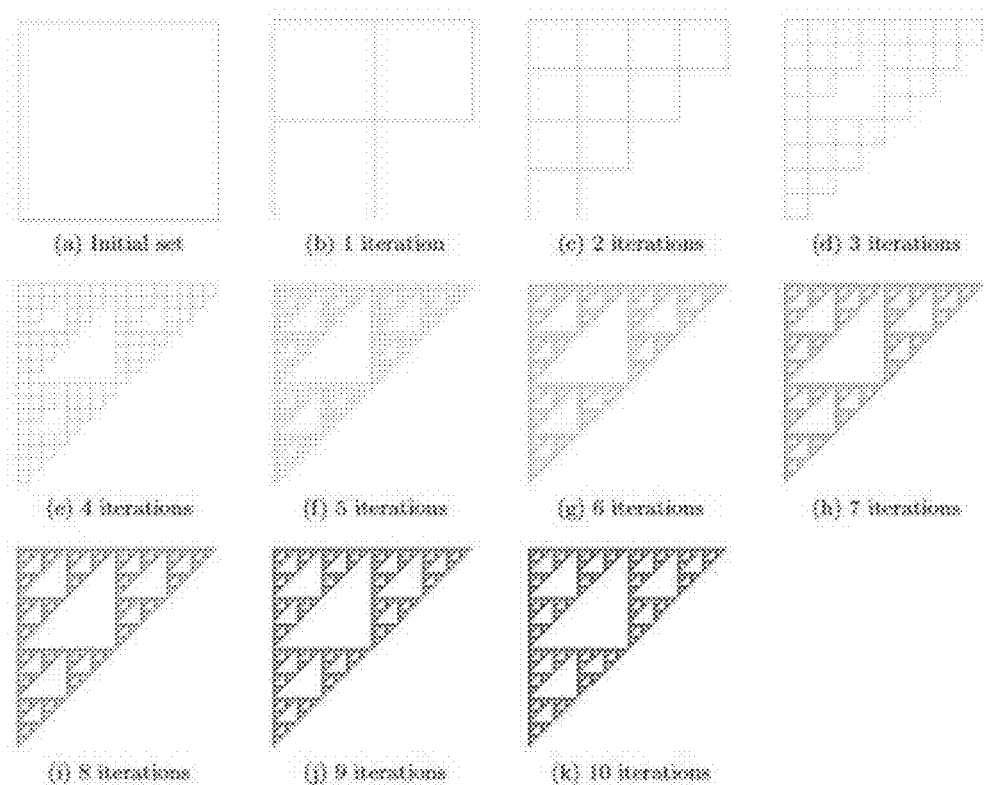
FIG. 10 illustrates output from a deterministic algorithm for a Sierpinski triangle in accordance with an embodiment of the invention.
Figure 11:
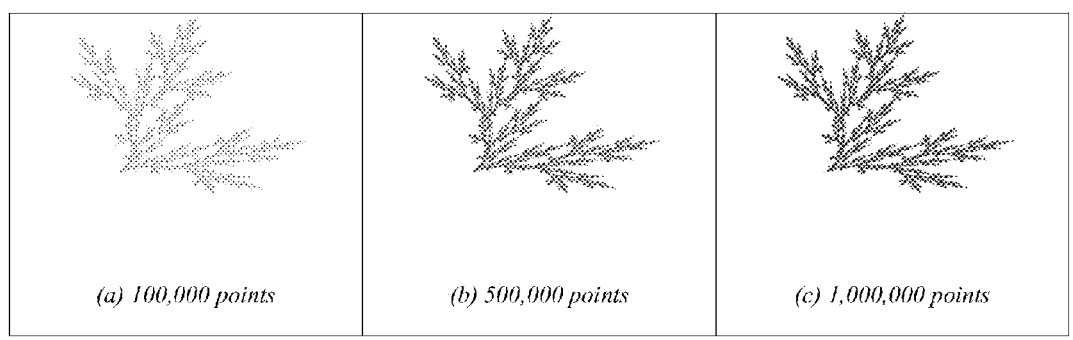
FIG. 11 depicts an example output from a random iteration algorithm for a self-affine fractal in accordance with an embodiment of the invention.

These two conditions state that fractals which satisfy the open-set condition can be separated, i.e., the contractions do not overlap. Using an IFS that meets the open-set condition, an initial image can be printed into a fractal by repeated iterations of the deterministic algorithm. This process is illustrated in FIGS. 14 and 15. FIG. 14 depicts the deterministic algorithm for the Sierpinski triangle, starting with an initial image including numbers. The algorithm is clearly drawing the same attractor from FIG. 10, while employing the numbers rather than the unfilled box as in FIG. 10. In particular, FIG. 14 shows five iterations after (portions (b)-(f)) after the initial image (a). FIG. 15 comprises a zoomed in portion of the imaged shown in portion (f) of FIG. 14. As can be seen, the attractor retains the details of the starting image, even at a zoomed in, higher resolution portion thereof. Thus, in accordance with embodiments of the invention, it is desirable to zoom in on one or more portions of a fractal image to retrieve information from this zoomed in portion thereof.

With current laser marking technology able to print a 1080p image into areas as small as 1 mm², the printed fractal will appear to be a normal fractal, but upon magnification with a microscope, the initial image can be recovered. A combination of ink jet printing and laser marking may also be employed. The self-similarity of fractals that satisfy the open-set condition ensures that multiple copies of the initial image will be clearly visible, providing robustness against occlusion or partial removal of the fractal. The method may be implemented in the following manner in accordance with an embodiment of the invention:

1) Select an initial image to be scaled down. The image can be arbitrary—it can contain an alphanumeric sequence, an image of a person's face, corporate logos, etc. The deterministic algorithm ensures that regardless of the initial image, the fractal will have the same shape. This initial image will be repeated a multiple of times in the final fractal.

2) Select a fractal that meets the open-set condition. As described above, the open-set condition ensures that the contraction maps do not overlap. The fractal may be chosen arbitrarily or selected by the user.

3) Draw the fractal by the deterministic algorithm. The number of iterations depends on various parameters, including the size of the area on which the fractal will be printed, the level of scaling of the initial image required by the user, and the capabilities of the laser marking system.

4) Print the fractal onto an object. Printing can be performed via laser marking or any other method capable of meeting the user's resolution requirements.

It is further anticipated that information provided at different scaling levels of resolution may be imaged sequentially, or in some other predetermined manner to confirm consistency of the data through the various levels of resolution, thus adding further robustness to the system.

Fractal Orbits

In accordance with one or more embodiments of the present invention, the complexity of fractals can be utilized in serialization—printing the same fractal but in different manners, allowing the fractal to carry information. This inventive method takes advantage of the fact that fractals defined by an IFS are the attractors of a discrete time stochastic dynamical system defined by the contraction mappings of the IFS. This can be seen in the random iteration algorithm, where an initial point is chosen and a sequence of points is generated. In the language of dynamical systems, these sequences are referred to as trajectories, or orbits. Since the fractal is an attractor of the dynamical system, any orbit that starts on the fractal will stay on the fractal. Hence, individual sequences of points can be marked on the fractal, and used for serialization.

Figure 16:
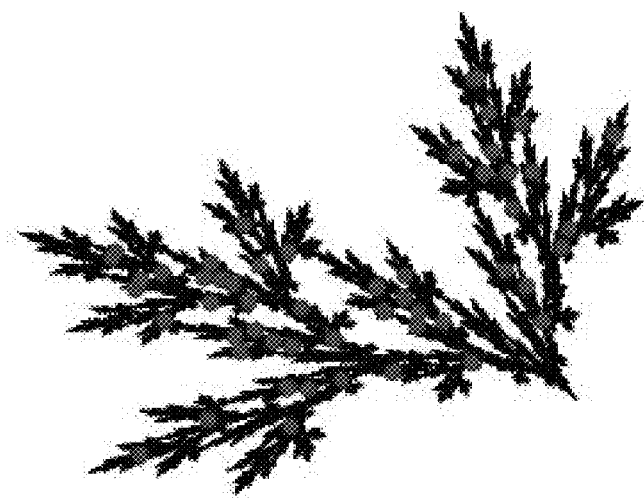
FIG. 16 depicts encoding of the word "fractal" on a fractal using contraction mapping that generated the fractal in accordance with an embodiment of the invention.

In addition to just marking fractal images, in accordance with an alternative embodiment of the invention, the orbits themselves can carry information. This is most easily seen with IFS's consisting of 2 contraction mappings, but can be applied to IFS's with any number of mappings. With 2 map IFS's, the mappings can be labeled $S_0$ and $S_1$. An orbit may be generated by function composition, i.e.

$$a_k = S^k(a_0) = S_{jk}(S_{jk-1}(\ldots (S_{j1}(a_0)))),$$

where $j_k \in \{0,1\}$, $k \in 1, 2, \ldots$. As this equation demonstrates, an orbit can be denoted by the sequence $j_k j_{k-1} \ldots j_1$. Since the $j_k$'s are either 0 or 1, there is a 1-1 correspondence between binary numbers and orbits of an IFS. As a result, sequences of ASCII characters can be marked on a fractal by the orbit generated by their binary representation. This is illustrated in FIG. 16, depicting encoding of the word "fractal" onto a fractal using the contraction mappings of the IFS that generated the fractal.

This further inventive method can be implemented as follows:

1) Select a fractal to encode. The contraction mappings associated with the fractal will be used to generate the orbit.

2) Encode an ASCII string containing user-supplied information. Any processing of the ASCII string will be performed in this step: message encryption, duplication, interleaving, Reed-Solomon error correction, etc.

3) Select a starting point, $a_0$, for the orbit. This can be designated by the user or randomly selected.

4) Generate the orbit corresponding to the binary string generated in step 2. The contraction mapping corresponding to the first digit of the binary string is applied to $a_0$, and the resulting point $a_1 = S_{j1}(a_0)$ is recorded. Next, generate $a_2 = S_{j2}(a_1)$. Repeat this process for each digit of the binary string.

5) Mark the points of the orbit generated in step 4 on the fractal itself. The points can be marked via special characters, color, or other conspicuous markings.

Decoding of the sequence can be implemented in accordance with an alternative embodiment of the invention as follows:

1) Identify the IFS using any of the previously described techniques.

2) Determine the starting point $a_0$ of the orbit. This point will be marked uniquely so it can be easily identified.

3) Determine the remaining points of the orbit that were printed on the fractal. These points may be marked for easy identification.

4) Search for the next point. The contraction maps of the identified IFS are individually applied to $a_0$, and the resulting points are recorded.

5) Compare the results of step 4. Using a user-defined metric, the orbit point closest to a transformed point is selected. The number corresponding to the contraction mapping which produced the closest transformed point is recorded.

6) Loop through the rest of the points. The process described in steps 4 and 5 is repeated for each point of the orbit.

7) Decode the orbits. The sequence of digits corresponding to the sequence of contraction mappings that generated the orbit are converted into ASCII characters.

Other Fractal Like Images

Figure 17:
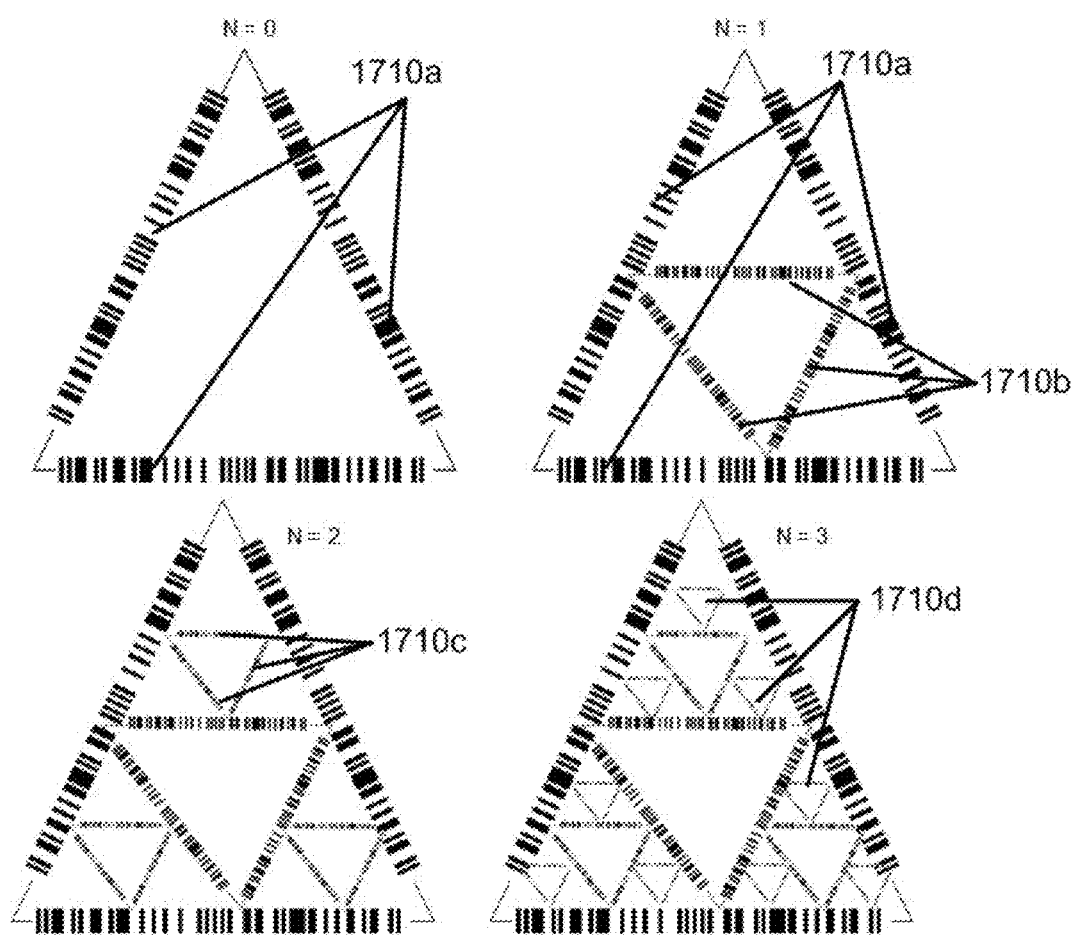
FIG. 17 depicts encoding a barcode in different levels of a self-similar fractal-like image in accordance with an embodiment of the invention.

As noted above, the various embodiments of the invention are also applicable to one or more fractal like images that share many characteristics of fractals, but are not necessarily pure fractals in the mathematical sense. These images may differ from fractals in any number of manners. For example, as is first shown in FIG. 17, a version of a triangle (iteration n=1) including information encoded on each leg thereof 1710a may be provided. After a fractal like iteration (iteration n=2), a similar but smaller triangle including information 1710b is provided. During a pure fractal iteration, each portion 1710a would be replaced with information 1710b. However, in accordance with this embodiment of the present invention, only portions of the new image that are presented in areas not already occupied by previous portions of the image are presented. Thus, as is shown in the n=2 iteration, two different sizes of information (in this case bar codes) are provided. As this progression continues to the n=3 iteration, additional 1710e information is superimposed on the previously provided information without replacing this information. The n=4 iteration further shows 1710d information being provided. Any number of desired iterations may also be employed. In accordance with this process, information is provided at different levels of resolution. Whereas the fractal system provides overall structure that is replicated at different levels of resolution, even though the component parts are provided in ever smaller portions, this particular embodiment of the invention provides component parts of the image at various levels of resolution. In order to provide additional complexity, the length of each of the individual sides of the image, and the various angles therebetween may be varied.

Figure 18:
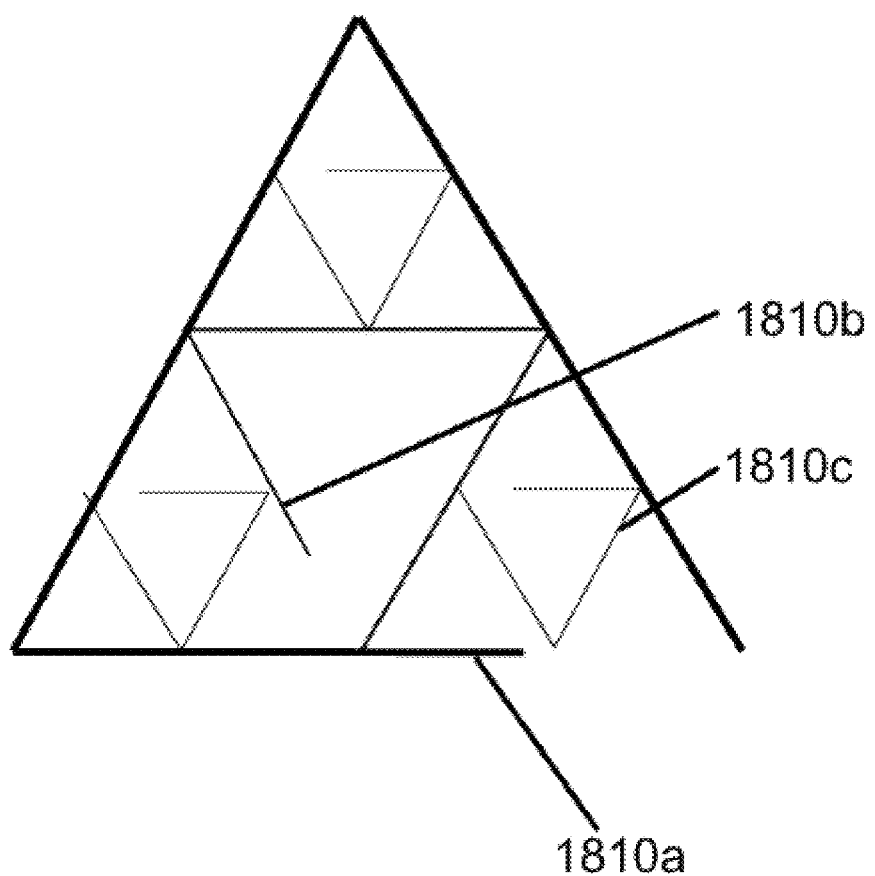
FIG. 18 depicts a fractal image similar to that of FIG. 17, but with additional complexity added by removing one or more portions of the image in accordance with an embodiment of the invention.

As is next shown in FIG. 18, a similar triangular fractal image can be provided with additional complexity by removing a portion of the initial image 1810a (see the missing portion thereof), and by rotating or otherwise changing the position of the initial image when reproduced. Thus, as is shown in FIG. 18, second level portions of the image 1810b are similar to portions 1810a, but changed in orientation. A similar change in orientation is yet again shown by portions of the image 1810c. By this change in position of portions of the image, additional information and robustness may be provided.

Figure 19:
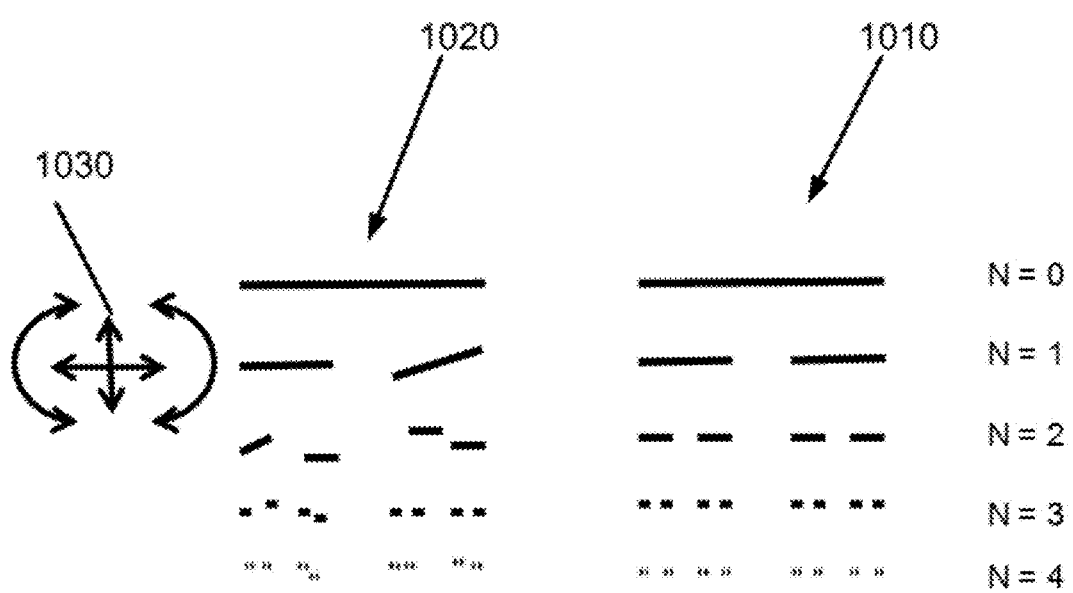
FIG. 19 depicts a standard fractal progression with modifications thereto to provide additional complexity to the image in accordance with an embodiment of the invention.

As is next shown at FIG. 19, a standard fractal image progression 1010 is shown in which each portion of an image is split at each iteration. Thus, as is shown, at iteration n=0, a single line is presented; at iteration n=1, two lines are presented; at iteration n=2, four lines are presented; at iteration n=3, eight lines are presented; and at iteration n=4, 16 lines are presented. In this manner an exponential progression of line segments is presented. In accordance with this particular embodiment of the invention, image progression 1020 may be presented, and comprises modification of absolute position and orientation (1030) of one or more of the line segments in each iteration to provide still further complexity in the image. This complexity also comprises unpredictable information that may aid in providing additional robustness to the system.

Figure 20:
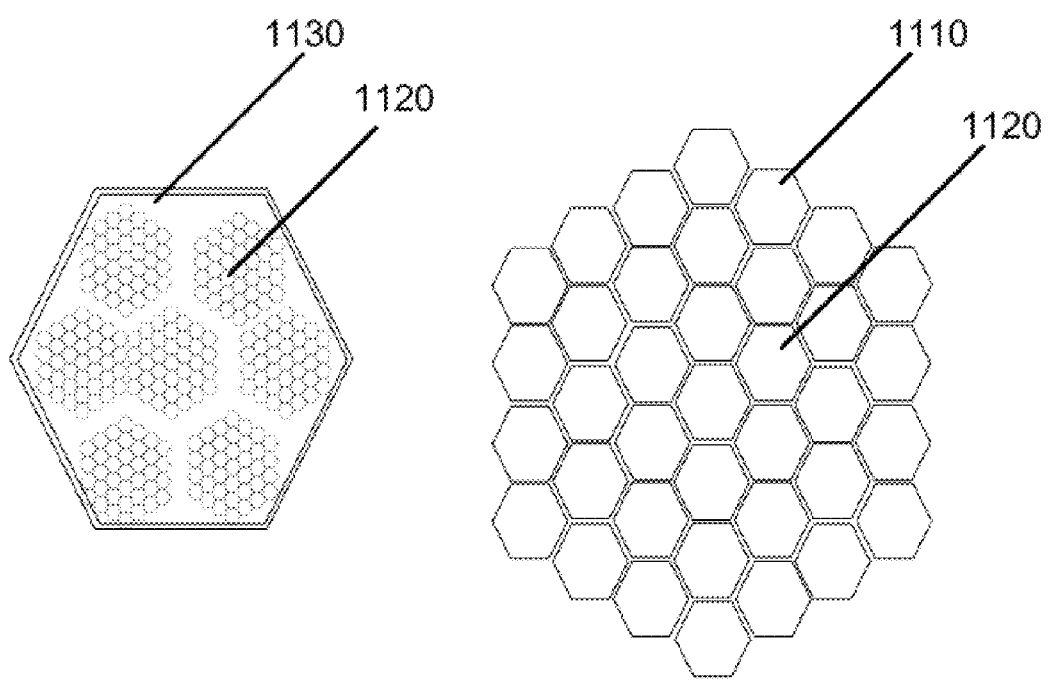
FIG. 20 depicts a plurality of image cells in accordance with an embodiment of the invention.

As is next shown in FIG. 20, a plurality of image cells 1110 may be provided. These image cells 1110 may comprise any desirable information therein. These plurality of image cells may be combined to comprise an image cluster 1120. Thus, the individual image cells may be provided structure relative to other image cells. Any desirable relationship between these cells may be provided. Additionally, each of these image clusters 1120 may be further combined to comprise a larger image cluster 1130, and may be placed within a single image cell 1110 of a larger cell, as desired. This process may be continued to as many levels as desirable, and thus provides a method of building up an image from a smallest desirable building block, rather than the methods describe above in which a largest image portion is provided and subdivided to provide additional complexity to the image.

Figure 21:
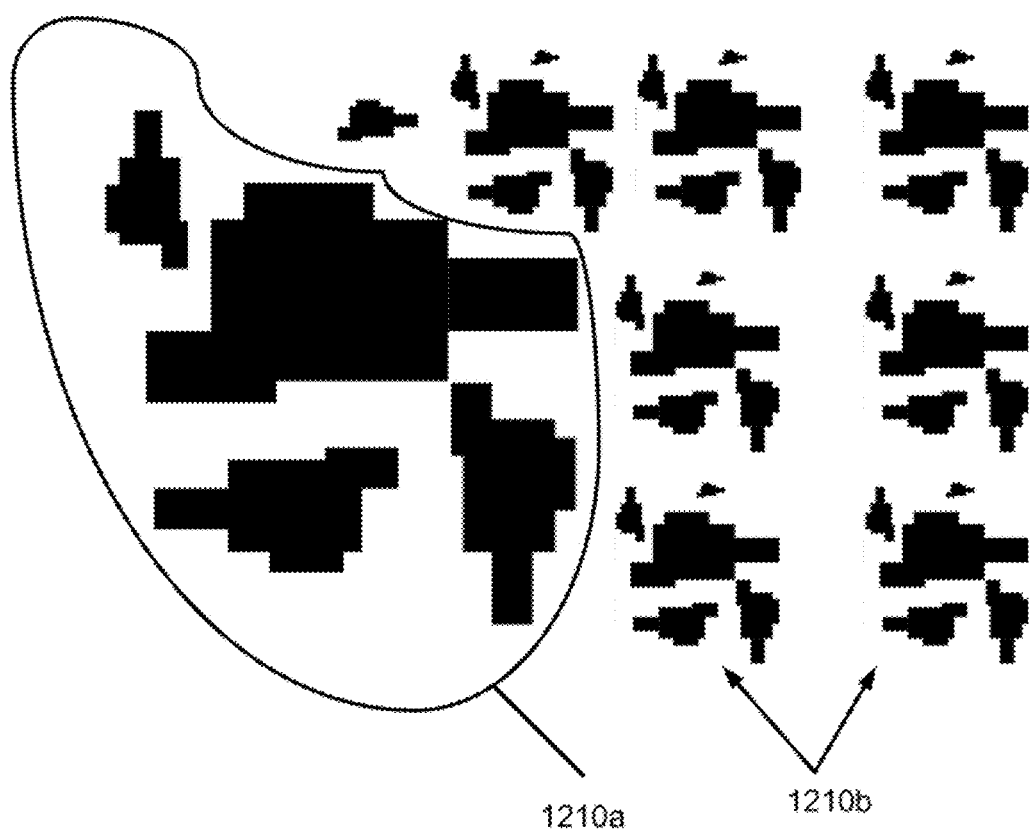
FIG. 21 depicts a further image including iterations of a complex image in accordance with an embodiment of the invention.
Figure 22:
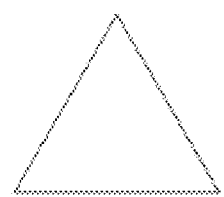
FIG. 22 depicts initiator, generator and a number of iterations of a Koch curve.
Figure 22:
Figure 22:
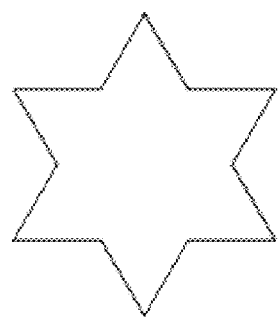
Figure 22:
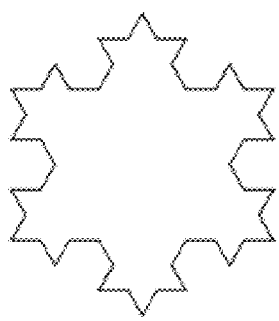
Figure 22:
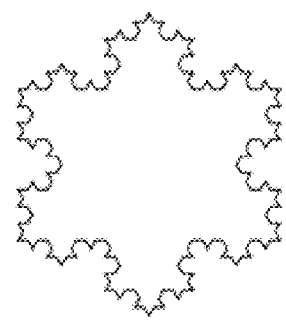

FIG. 21 depicts a still further embodiment of the invention in which a complex image 1210a is provided at a predetermined position and size. Additional predetermined sized versions of this image 1210b may be provided at a predetermine positions relative to the initial image 1210a. This information therefore may be provided across an extended area, and provided at predetermined sizes and positions to encode various information. Other additional configurations and sizes may be further provided.

Therefore, in accordance with one or more embodiments of the present invention, fractal or fractal like images may be employed to allow for improved identification and authentication systems and methods. Such systems and methods may be applied to any desirable object, and may preferably be applied to a medication pill to allow for identification and authentication of medication down to the individual pill level, thus improving robustness of the identification and authentication system against counterfeit or other identification errors.

L-System Fractals

Encoding

Therefore, in accordance with one or more preferred embodiments of the present invention, an inventive encoding process may be implemented in the following manner, although additional encoding processes may also be employed:

1. Convert a string of ASCII characters into their 8-bit binary representation.
2. Apply preprocessing (error correction, message duplication, etc.) to binary representation.
3. Select fractal curve based on application parameters.
4. Print encoded fractal curve.

Step 1 involves ASCII to binary conversion. As an example, here is the binary representation of the string, "L-system":

In this particular example of the embodiment, the string "L-system" contains characters, so the binary representation contains digits. Any fractal curve (or other mathematical system) with at least line segments can be used to encode the string. Of course, other non-binary encoding systems may be employed, so that each character may comprise one or two or more states.

Step 2 involves preprocessing of the binary string generated from step 1. Error correction methods such as Reed-Solomon can be implemented, along with redundancy features such as string duplication or interleaving. This step may also be skipped if desired, in accordance with various implementations of the invention.

Step 3 involves determining the parameters based on the specific application. The size of the preprocessed binary string from step 2 is compared to parameters including printing area, size of the fractal curve, and number of line segments needed to encode the binary string. An appropriate fractal curve with the needed number of iterations is selected based on the parameters. Any additional factors may also be employed in order to determine a desired fractal curve (or other mathematical system), as long as the basic elements set forth herein are met.

Figure 23:
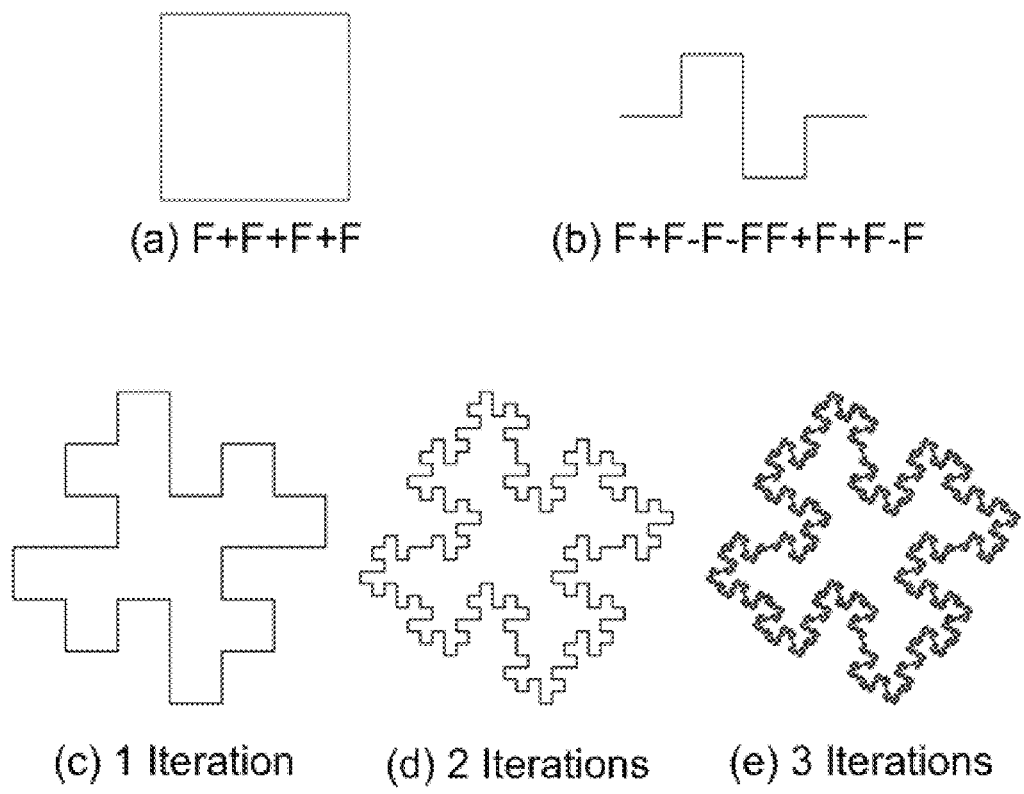
FIG. 23 depicts construction of a quadratic Koch curve using L-systems.
Figure 24:
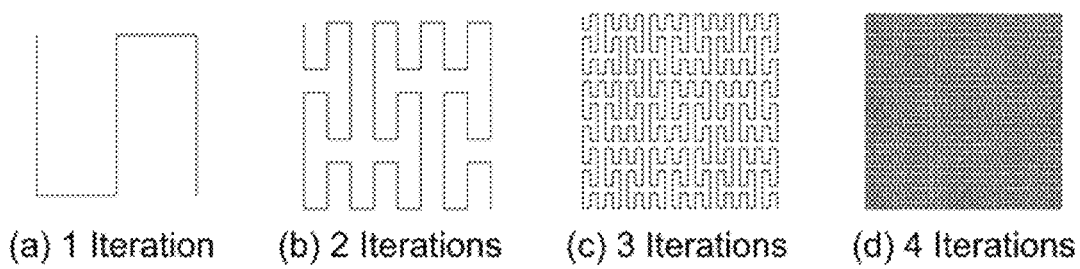
FIG. 24 depicts construction of a Peano space-filling curve using L-systems.
Figure 25:
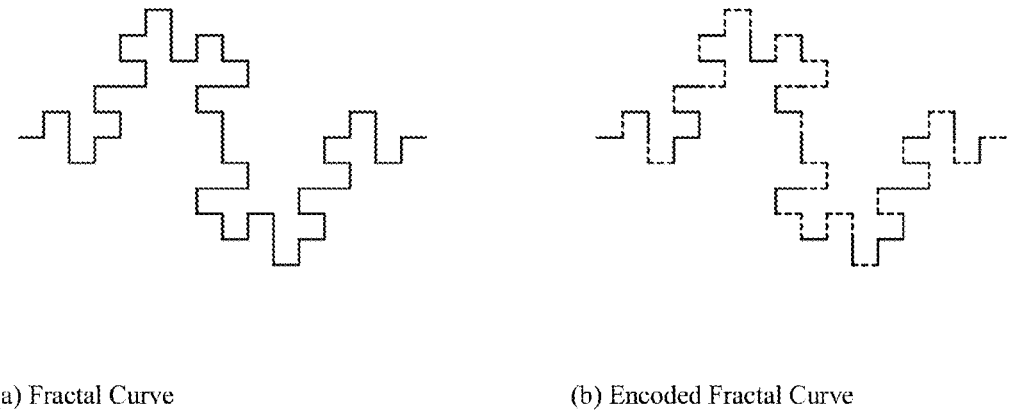
FIG. 25 depicts encoding of a fractal curve in accordance with an embodiment of the invention.
Figure 26:
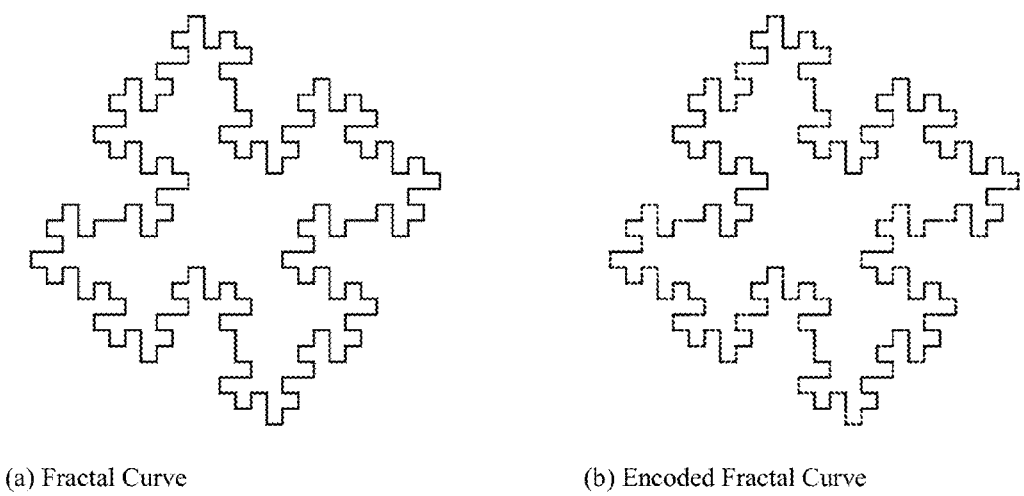
FIG. 26 depicts encoding of a fractal curve in accordance with an embodiment of the invention.

Step 4 involves the printing of the encoded fractal curve based on the information gathered from step 3. FIGS. 25 and 26 illustrate this process. FIG. 25 depicts encoding of a fractal curve in which (a) is the 2nd iteration of a fractal curve created with a single line segment as the generator and the initiator from FIG. 2. It contains line segments. (b) is the same curve encoded with the string "L-system"; 's are represented by solid segments, 's by dashed line segments. FIG. 26 also depicts encoding of a fractal curve in which (a) is the 2nd iteration of the fractal curve from FIG. 23. It contains line segments. (b) is the same curve encoded with the string "fractal barcoding technology"; 's are represented by solid segments, 's by dashed line segments. Note the solid region on the curve: this represents a synchronization sequence.

Therefore in accordance with various embodiments of the invention, as the figures demonstrate, fractal curves can encode a large amount of information in a compact manner.

Decoding

An inventive decoding process for such a generated fractal barcode first determines a type of barcode employed. The determination preferably depends on whether the barcode is assumed to be generated in accordance with a template or is accepted as a free form curve embedded in an image. If the decoder expects a fractal barcode in a template, then the decoder will preferably first extract the fractal barcode from the background, rotate and align it, and then check line segments at expected locations, in effect comparing the portions of the fractal image to the template. If the fractal barcode is accepted as a free form curve, then the decoder will preferably determine a starting location on the curve, determine where the next line segment is located, iterate through each sequential line segment, and extract information based on the characteristics of the line segments. Therefore, in accordance with an embodiment of the invention, the decoding process for a templated fractal curve can be implemented in the following manner:

1. Extract image of fractal barcode.
2. Rotate and scale image.
3. Detect line segments at expected locations and extract binary string.
4. Decode resulting binary string.

Step 1 involves accepting an image of the fractal barcode and determining the corner points of the template. As with most two-dimensional barcoding methods, the fractal barcode may be placed in a square region with the corner points clearly delineated for easy recognition. Of course, and other method for aligning such a fractal barcode may be employed.

Step 2 involves placing the fractal barcode in proper alignment for line segment extraction. Since the fractal barcode is preferably extracted from real-world images, it may be assumed that the barcode region is not perfectly aligned. Based on the relative location of the corner points, the image is preferably properly rotated and aligned into the desired region using a perspective transform, which maps quadrilaterals to quadrilaterals. Other methods of such additional alignment may also be employed.

Step 3 involves iterating through the sequence of line segments at their expected locations. Line segment detection may be performed using the Hough transform or other appropriate method, and binary digits are preferably assigned on whether a line segment has been detected or not at appropriate locations. The output of iterating through all the line segment locations is a binary string.

Step 4 involves the decoding of the binary string extracted from step 3.

In accordance with an alternative embodiment of the invention, the decoding process for a free form fractal curve can be implemented in the following manner:

1. Extract image of fractal barcode.
2. Detect line segments.
3. Check status of line segments and extract binary string.
4. Decode resulting binary string.

Step 1 involves accepting an image of the fractal barcode. No requirements are preferably made on positioning, rotation, alignment, etc. The fractal curve is extracted from the background using standard computer vision techniques (thresholding, Canny edge detection, etc.).

Step 2 involves using the Hough transform (or other appropriate mathematical system or the like) to detect line segments. The line segments are ordered sequentially, so the decoder will preferably iterate through the fractal curve, extracting the location of each line string one after another.

Step 3 involves checking the status of each detected line segment. Here, status is preferably the line color or type, but any type of line segment differentiator may be employed. A binary digit will be assigned to each line segment based on the line type, creating a binary string.

Step 4 involves the decoding of the binary string extracted from step 3. If the fractal curve is closed (as in FIG. 5), then the binary string will be synchronized to recover the proper starting position and the resulting binary string decoded. Thus, after traversing the entire fractal curve, the position of the fractal curve may be shifted until a starting point of the fractal curve is properly aligned, thus allowing for extraction of proper codes. This may include sequentially applying one or more rules to such a determined binary string to further determine if such a sequence follows one or more rules for decoding. Other methods may be employed for extracting the information from the fractal curve. As noted above, while a binary encoding system is described, encoding of the one or more line segments may include any number of differentiable formats. Thus encoding a system employing an English alphabet may be realized using 26 different types of line segments in the image. Any other encoding system may also be embodied.

Information Scaling

With the scaling of line segments that occurs in the generation of L-systems fractals, information can be encoded into each individual line segment, rather than being spread out over the entire fractal. With current laser marking technology able to print 1080p images into areas as small as, information can be effectively scaled within a fractal pattern, with retrieval of the pattern on a line segment requiring scanning with a microscope. This results in a secure method for embedding information into a fractal pattern, while still maintaining the overall characteristics of the fractal. This method can be implemented in the following manner:

1. Initialize line segment.
2. Select L-system fractal.
3. Determine parameters for printing fractal.
4. Print fractal pattern.

Step 1 comprises initialization of the line segment where information will be stored. The user can select any format they choose for encoding the line segment.

Step 2 comprises selection of an L-system fractal. The fractal can be chosen arbitrarily or selected by the user.

Step 3 comprises parameter determination. Parameters include size of area where the fractal will be printed, number of iterations for generation of the fractal, limitations of printing technology that will be used in step 4, and limitations of scanning equipment for information retrieval.

Step 4 comprises the printing of the resulting fractal pattern from the parameters derived in step 3.

Example Applications:

One or more possible applications are outlined below. This list should be considered exemplary, and should not be construed as limiting the application of the inventive technology to other applications.

Such a fractal image may be applied as a security labeling system to any item that is created in batches and may be varied in shape, such as medication pills in the manner as describe above. When combined with a facial recognition system, matching of patient and medication can be performed. The fractal image may be applied as a game on candy as a replacement to a "scratch and win" system, thus creating a show and win application, requiring the showing of the candy with the fractal image thereon being shown to an imaging device such as a web cam on a computer, mobile device or the like.

Such a fractal image may be applied to handbags or other fabric/clothing on the inside of a garment or label (as difficult to replicate directly onto a 3d texture/surface).

Such a fractal image system may also be employed with an identification systems employing facial recognition, or other biometric identification system. Thus, identification of a patient or other user may be made employing one or more known identification systems, such as those noted above or others. Pill identification may them be performed, and a confirmation that the particular identified user is to take the identified pill. If customized fractal images are to be used, the system may be able to determine whether the particular pill being imaged is being taken at the right time by the correct person. Thus, through the ability to personalize such medication pills by batch number, patient, or particular pill dosage, a link between the pill and user may be established and confirmed. Release of such personalized information may therefore be predicated on proper biometric or other identification.

The following features may also be provided in accordance with the inventive system, as related to reporting of various results of identification determinations. Use of the inventive fractal identification systems may be employed to provide an audit trail for a pill or object manufacturer. Thus, upon use of the inventive fractal recognition system by a consumer, seller, or other individual, it may be possible to log results and alert the manufacturer if imaged fractal identifiers show low confidence (based on fractal integration with object—shape, color, texture, curvature), thus perhaps indicating an intent to replicate or otherwise provide a counterfeit product. Such information, along with location data, may be provided to authorities or other systems for tracking such counterfeiting, and in order to determine or identify counterfeit drug distribution points, or other areas with such high counterfeit drugs. Consumers may be provided with an incentive to check the identity of such fractal images, thus increasing availability of such widely spread identification information.

Similarly, to the extent that imaging of the fractal images determines that exact matches are present, similar information indicating positive results, and a likely absence of such counterfeiting may be provided to the manufacturer. Such information may also include coded information, such as batch, time/date, location and other information that may be available. Consumers may also be provided this positive match information so that they can be sure that their pill or other item is genuine, and that their security is being safeguarded.

System Benefits

Benefits of employing the inventive fractal imaging system are myriad. The use of an ink jet printing process is easily available, and relatively inexpensive while remaining flexible. Other printing or etching processes, such as one or more of those noted above, may be employed when other combinations of cost and security are to be considered, or when mass printing is to be employed. Mass batch and continuous processing avoids costs associated with properly printing images on individual pills or other objects. Thus, the fractal images may be quickly modified, by including changes to the parameters for generating the fractal images, thus being indicative of various coding included in the fractal image.

A fractal library database that changes over time may be employed, in the manner noted above, so that changes over time may be documented and later confirmed. Such a fractal database may also be tailored to webcam resolutions commonly used in smartphones, thus providing fractal images with resolution acceptable and able to be imaged by standard webcams in smartphones. Since the ID can be confirmed via a consumer with a mobile device and smart phone, it means that no special scanning hardware is needed. Thus, manufacturers or others may educate consumers to image and verify authenticity of an image, such as through imaging using a webcam on a mobile device or the like.

Confidence levels will allow for different security options. Thus different levels of resolution may be employed based upon a level of desired security. Higher resolution images, requiring higher resolution imaging devices may be employed for higher security applications, while lower resolution imaging and printing may be employed for lower security options. If the inkjet is a low quality printer, then distribution at higher resolutions (as measured by the camera) may suggest that fraud was committed if the ink distribution (or one or more other printing attributes) is different to what is expected.

As noted above, since inkjet or other etching or printing technologies may allow for rapid changing of patterns, one can quickly update a fractal pattern to be printed, and link the pattern to specific dates of production and/or batch numbers. This may be especially useful for perishables or medications that go out of date. Also may be useful for fashion items where dates of production are important. Use of older fractal patterns on newer objects may suggest counterfeiting, for example. Inks that fade over time may be employed, thus indicating passage of substantial time, or the like. Alternatively, inks that may be wiped off or otherwise removed may be employed to allow for maintenance in the integrity of the item, while still providing desired levels of security.

As described above, it is easy to print whole or part of the fractal image onto the medication as alignment is not critical. The inventive technology allows pills and objects of different shapes, curvature, and sizes to be labeled uniquely. In fact the unique shape, color and texture of the item allows for a unique ID to be printed and can help to differentiate close but not identical items. The shape of the pill or item may have an influence on the way the fractal is printed allowing for expected distortions in the pattern to be recognized. This robust system may be particularly useful in identifying counterfeit items that may have slightly different shapes.

As further described above, one or more fractal patterns may have a number of different colors built in that act as a calibration code. When pills or other objects appear to be slightly different in color when compared to the fractal—pill combination (a known color gradient and range of the fractal and ratio with the pill), then a warning sign can be issued. Thus, comparison of the color of the pill or other object to the fractal, or consideration of an effect the color of the pill or other object may have on the color of the fractal may aid in the determination of status of the pill or other object. Furthermore, as each object surface will have a unique texture, the fractal may be distorted in a predictable, measurable manner in accordance with this known object surface texture. This allows for texture to be identified as well of a specific surface and differences flagged.

Fractal identification labeling is far superior to existing imaging labels because it does not require the whole fractal necessarily to be printed on the medication or other object. Use of the inventive printed fractal image will allow for occlusion by the user (due to fingers blocking image or poor environmental conditions) as only a portion of the image may be required to reach desired confidence levels. Such a fractal identification label does not suffer from occlusion problems (e.g. traditionally, one number hidden or obscured may inhibit use of the ID system). Computer vision may therefore be used to learn and to identify replicating blurred images in the fractal and/or expected ratios of patterns, colors or shapes. In the event that occlusion occurs due to the environment and/or finger occlusion, then the system may be able to "piece together" different parts of available fractal images/sections, to create a complete code within a certainty range. Furthermore, fractal identification may operate better than a number, or more traditional barcode, as it is more difficult to replicate.

This is the first universal pill labeling system developed through geometry. The problem with present day technology is that it does not label the pill, or if it does label the pill the information is inaccessible to the public or can be easily copied or destroyed. The present invention is novel because it concentrates solely on the printing of the pill and the organic nature of the fractal patterns themselves, and the complexity embedded within them, to make the system extremely difficult to replicate. The fractal patterns may blanket the entire surface of the pill. Any random segment of the pill, no matter how small or how large, will be able to be used to identify it. This is a tremendous improvement over barcodes, which are static fixed-form labels that do not lend themselves to different resolutions, and are also easily copied, damaged, and do not adapt to the physical configuration of a pill. Progressively higher levels of fractal resolution will also allow for progressively higher levels of security authentication. It is the first solution that addresses high security pill identification needs with public accessibility.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that this description is intended to cover all of the generic and specific features of the invention herein described and all statements of the scope of the invention which, as a matter of language, might be said to fall there between.

What is claimed:

1. A system for identifying one or more objects, comprising:
    a printer for printing a fractal pattern having a first predetermined number of fractal dimensions at a first predetermined resolution to the one or more objects; and
    an imaging apparatus for imaging from the one or more objects the printed fractal pattern at a second predetermined number of fractal dimensions at a second predetermined resolution.

2. The system of claim 1, wherein the one or more objects comprise medication pills.

3. The system of claim 1, wherein the fractal pattern includes one or more piece of coded information contained therein.

4. The system of claim 1, wherein a portion of the fractal image is printed on each of the one or more objects.

5. The system of claim 1, wherein the fractal image is defined in accordance with an Integrated Function System.

6. The system of claim 1, wherein the encoded fractal image is defined in accordance with an L-system.

7. A method for identifying one or more objects, comprising the steps of:
    providing the one or more objects to a printing location;
    defining a fractal pattern to be printed to the one or more objects;
    printing a fractal image to the one or more objects, the fractal image having a first predetermined number of fractal dimensions at a first predetermined resolution; and
    imaging from the one or more objects the printed fractal pattern at a second predetermined number of fractal dimensions at a second predetermined resolution.

8. The method of claim 7, wherein the one or more objects comprise medication pills.

9. The method of claim 7, wherein the fractal pattern includes one or more piece of coded information contained therein.

10. The method of claim 7, wherein a portion of the fractal image is printed on each of the one or more objects.

11. The method of claim 7, wherein the fractal image is defined in accordance with an Integrated Function System.

12. The method of claim 7, wherein the fractal image is defined in accordance with an L-system.

13. The method of claim 7, wherein the fractal image is selectively printed with a higher resolution.

14. The method of claim 7, wherein the fractal image further comprises a combination of a plurality of fractal images.

* * * * *